United States Patent
Agrawal et al.

(10) Patent No.: US 12,541,529 B2
(45) Date of Patent: Feb. 3, 2026

(54) EFFICIENT EXTRACTION OF PROVENANCE INFORMATION FROM DATABASE QUERY EXECUTION LOGS

(71) Applicant: Microsoft Technology Licensing, LLC, Redmond, WA (US)

(72) Inventors: Ashvin Agrawal, Cupertino, CA (US); Fotios Psallidas, Brooklyn, NY (US); Konstantinos Karanasos, San Francisco, CA (US); Carlo Aldo Curino, Woodinville, WA (US); Raghunath Ramakrishnan, Bellevue, WA (US); Chandrasekar Sugunan, Redmond, WA (US); Khaled Mohamed Morssi Ibrahim, Bellevue, WA (US); Steven Peter Herbert, Woodinville, WA (US); Biao Zhang, Shanghai (CN); Chao Pan, Shanghai (CN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 87 days.

(21) Appl. No.: 18/705,449

(22) PCT Filed: Oct. 28, 2021

(86) PCT No.: PCT/CN2021/126916
§ 371 (c)(1),
(2) Date: Apr. 26, 2024

(87) PCT Pub. No.: WO2023/070417
PCT Pub. Date: May 4, 2023

(65) Prior Publication Data
US 2025/0238432 A1    Jul. 24, 2025

(51) Int. Cl.
G06F 16/25      (2019.01)
G06F 16/2455   (2019.01)

(52) U.S. Cl.
CPC ........ G06F 16/254 (2019.01); G06F 16/2455 (2019.01)

(58) Field of Classification Search
CPC ........................... G06F 16/254; G06F 16/2455
(Continued)

(56) References Cited

U.S. PATENT DOCUMENTS 9,659,042 B2 *  5/2017  Puri ......................... G06F 16/35
9,811,573 B1 * 11/2017  Xiang ..................... G06F 16/26
(Continued)

FOREIGN PATENT DOCUMENTS

EP    2674878 A1    12/2013
EP    3493085 A1    6/2019

OTHER PUBLICATIONS

First Office Action Received for Chinese Application No. 202180093607.7, mailed on Aug. 30, 2025, 13 Pages (English Translation Provided).
(Continued)

*Primary Examiner* — Hanh B Thai
(74) *Attorney, Agent, or Firm* — Weaver IP L.L.C.

(57) ABSTRACT

Systems, methods, and devices are described for efficient extraction of provenance information from database query execution logs. A set of event records extracted from one or more database query execution logs is received. Groups of related event records are identified, and each defined as an activity. For each activity, an activity data structure is generated based on the associated event records. The data structure encodes query execution dependencies for the activity. For each activity, runtime information is extracted by identifying and instantiating process entities and rela-
(Continued)

tionships based on the associated event records and activity data data structure. For each activity, lineage information is extracted by identifying and instantiating dataset entities and their lineage relationships based on query text within the associated event records. The lineage information is mapped to the runtime information for each activity to generate and store a provenance data model for use by one or more provenance applications.

20 Claims, 12 Drawing Sheets

(58) Field of Classification Search
USPC .......................................................... 707/602
See application file for complete search history.

(56) References Cited

U.S. PATENT DOCUMENTS

| | | | | |
|---|---|---|---|---|
| 9,959,295 | B1* | 5/2018 | Kapoor | G06F 16/211 |
| 10,635,700 | B2* | 4/2020 | Arora | G06F 9/45558 |
| 11,775,898 | B1* | 10/2023 | Thompson | G06Q 10/06315 |
| | | | | 707/999.102 |
| 11,928,125 | B2* | 3/2024 | Mudumba | G06F 16/258 |
| 2007/0179959 | A1* | 8/2007 | Sharma | G06V 10/96 |
| 2010/0114630 | A1* | 5/2010 | Adler | G06Q 10/063 |
| | | | | 345/440 |
| 2013/0332423 | A1* | 12/2013 | Puri | G06F 16/35 |
| | | | | 707/687 |
| 2014/0114907 | A1* | 4/2014 | Kozina | G06F 16/219 |
| | | | | 707/602 |
| 2016/0012153 | A1* | 1/2016 | Gralnick | G06F 16/9024 |
| | | | | 707/743 |
| 2017/0017708 | A1* | 1/2017 | Fuchs | G06F 16/288 |
| 2017/0300558 | A1* | 10/2017 | Damodaran | G06F 16/332 |
| 2018/0074870 | A1* | 3/2018 | Park | G06F 16/278 |
| 2018/0075163 | A1* | 3/2018 | Park | G06F 16/248 |
| 2018/0107530 | A1* | 4/2018 | Gupta | G06F 16/2282 |
| 2019/0138627 | A1* | 5/2019 | Raman | G06F 9/44521 |
| 2019/0138654 | A1 | 5/2019 | Arora et al. | |
| 2020/0026710 | A1* | 1/2020 | Przada | G06N 20/00 |
| 2020/0349152 | A1* | 11/2020 | Pryce | G06F 16/2458 |
| 2021/0117437 | A1* | 4/2021 | Gibson | G06F 16/258 |
| 2021/0273965 | A1* | 9/2021 | Pi | G06N 20/00 |
| 2021/0334254 | A1* | 10/2021 | Thompson | G06Q 10/06315 |
| 2021/0357803 | A1* | 11/2021 | Bhide | G06N 5/02 |

OTHER PUBLICATIONS

"Extended events overview", Retrieved from https://learn.microsoft.com/en-US/sql/relational-databases/extended-events/extended-events?view=sql-server-ver16, Oct. 24, 2023, 7 Pages.

"Apache Atlas—Type System", accessed on URL: https://atlas.apache.org/2.0.0/TypeSystem.html, Jun. 28, 2019, 6 pages.

Amsterdamer, et al., "Putting Lipstick on Pig: Enabling Database-style Workflow Provenance", Arxiv Cornell University, Dec. 31, 2011, 12 pages.

Bernstein, et al., "A Vision for Management of Complex Models", ACM SIGMOD Record, vol. 29, Issue 4, Dec. 1, 2000, pp. 55-63.

Bhagwat, et al., "An Annotation Management System for Relational Databases", The VLDB Journal, vol. 14, Oct. 25, 2005, pp. 373-396.

Cheney, et al., "Provenance in databases: Why, how, and where", Foundations and Trends® in Databases, vol. 1, No. 4, Jun. 2, 2009, pp. 379-474.

Glavic, et al., "Perm: Processing provenance and data on the same data model through query rewriting", IEEE 25th International Conference on Data Engineering, 2009, pp. 174-185.

Green et al., "Update Exchange with Mappings and Provenance", VLDB '07: Proceedings of the 33rd international conference on Very large databases, Sep. 23, 2007, pp. 675-686.

Herschel, et al., "A survey on provenance: What for? What form? What from?", The VLDB Journal, vol. 26, Oct. 16, 2017, pp. 881-906.

Hull at al., "Taverna: a tool for building and running workflows of services", Nucleic Acid Research, vol. 34, Jul. 1, 2006, 4 pages.

Ikeda, Robert, "Provenance in Data-Oriented Workflows", Stanford University ProQuest Dissertations, Nov. 2012, 24 pages.

International Search Report and Written Opinion received for PCT Application No. PCT/CN21/126916, Apr. 20, 2022, 12 pages.

Lu, et al., "What bugs cause production cloud incidents?", Proceedings of the Workshop on Hot Topics in Operating Systems, May 13, 2019, pp. 155-162.

Ludascher, et al., "Scientific workflow management and the Kepler system", Concurrency and computation: Practice and experience, vol. 18, No. 10, Dec. 13, 2005, pp. 1039-1065.

Nargesian, et al., "Data Lake Management: Challenges and Opportunities", Proceedings of the VLDB Endowment, vol. 12, Issue 12, Aug. 1, 2019, pp. 1986-1989.

Niu, et al., "Provenance-Aware Query Optimization", IEEE 33rd International Conference on Data Engineering (ICDE), May 18, 2017, pp. 473-484.

Olston, et al., "Ibis: A Provenance Manager for Multi-Layer Systems", CIDR, Jan. 2011, pp. 152-159.f Psallidas, et al., "Smoke: Fine-grained lineage at interactive speed", Arxiv Cornell University, Jan. 22, 2018, 24 pages.

Scherbaum, et al., "Spline: Spark Lineage, not only for the Banking Industry", IEEE International Conference on Big Data and Smart Computing, May 28, 2018, 4 pages.

Tang, et al., "SAC: A System for Big Data Lineage Tracking", IEEE 35th International Conference on Data Engineering (ICDE), Jun. 6, 2019, 4 pages.

Widom, Jennifer, et al., "Trio: a system for integrated management of data, accuracy, and lineage", CIDR, 2005, 15 pages.

Woodruff, et al., "Supporting Fine-Grained Data Lineage in a Database Visualizration Environment", Proceedings 13th International Conference on Data Engineering, Aug. 6, 2002, pp. 91-102.

Yingwei Cui, "Lineage tracing in data warehouses", Dec. 2001, 208 Pages.

* cited by examiner

600

| Activity ID | Event Type | Query Text |
|---|---|---|
| 1 | sql_statement_started | CREATE PROCEDURE CleanAndAppendSalesHistory... |
| 1 | sql_statement_completed | CREATE PROCEDURE CleanAndAppendSalesHistory... |
| 2 | sql_statement_started | CREATE PROCEDURE SyncNewSales... |
| 2 | sql_statement_completed | CREATE PROCEDURE SyncNewSales... |
| 3 | sql_statement_started | EXECUTE SyncNewSales 2; |
| 3 | sp_statement_started | IF EXISTS(SELECT * FROM INFORMATION_SCHEMA.TABLES WHERE name='StagedSales') |
| 3 | sp_statement_completed | IF EXISTS(SELECT * FROM INFORMATION_SCHEMA.TABLES WHERE name='StagedSales') |
| 3 | sp_statement_started | DROP TABLE StagedSales; |
| 3 | sp_statement_completed | DROP TABLE StagedSales; |
| 3 | sp_statement_started | BULK INSERT StagedSales FROM 'newSales.csv'; |
| 3 | sp_statement_completed | BULK INSERT StagedSales FROM 'newSales.csv'; |
| 3 | sp_statement_started | EXECUTE CleanAndAppendSalesHistory @trackingSystemVersion; |
| 3 | sp_statement_started | if @trackingSystemVersion = 1 |
| 3 | sp_statement_completed | if @trackingSystemVersion = 1 |
| 3 | sp_statement_started | INSERT SaleHistory SELECT * FROM StagedSales |
| 3 | sp_statement_completed | INSERT SaleHistory SELECT * FROM StagedSales |
| 3 | sp_statement_completed | EXECUTE CleanAndAppendSalesHistory @trackingSystemVersion; |
| 3 | sql_statement_completed | EXECUTE SyncNewSales 2; |

FIG. 6

EFFICIENT EXTRACTION OF PROVENANCE INFORMATION FROM DATABASE QUERY EXECUTION LOGS

CROSS REFERENCE TO RELATED APPLICATION

This application is a National Phase application of International Application No. PCT/CN2021/126916 filed Oct. 28, 2021, the disclosure of which is incorporated by reference herein in its entirety.

BACKGROUND

Provenance information is a type of information that can assist in answering the questions of why and how a dataset was produced, who produced it, and when it was produced. In an era where enterprise functions mandate processing data originating from multiple, potentially disparate, sources and through complicated workflows, enterprise systems may rely on provenance information across these workflows. Establishing confidence in accuracy and trustworthiness of business data, explaining analysis results and outcomes, debugging, and foreseeing the impact of data and schema mutations are only just a few example applications that provenance information can assist in. This need for provenance information has increased with the popularity of data governance and cataloging tools, as evidenced by the growth in cloud services that facilitate the management of an up-to-date map of data assets using tools for data discovery and provenance extraction.

BRIEF SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and apparatuses are described for efficient extraction of provenance information from database query execution logs. A set of query execution event records extracted from one or more database query execution logs is received. Groups of related query execution event records within the set of query execution event records are identified. Each group is defined as an activity. For each activity, an activity data structure is generated based on the group of query execution event records associated with the activity. The activity data structure encodes query execution dependencies for the activity. For each activity, runtime information is extracted by identifying and instantiating process entities and relationships for the activity based on the group of query execution event records and the activity data structure associated with the activity. For each activity, lineage information is extracted by identifying and instantiating dataset entities and their lineage relationships based on query text within the query execution event records associated with the activity. The lineage information is mapped to the runtime information for each activity to generate a provenance data model. The provenance data model is stored for use by a provenance application.

Further features and advantages of the embodiments, as well as the structure and operation of various embodiments, are described in detail below with reference to the accompanying drawings. It is noted that the claimed subject matter is not limited to the specific examples described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

FIG. 6 depicts an example set of query execution event records associated with example activities.

Embodiments will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

Figure 1:
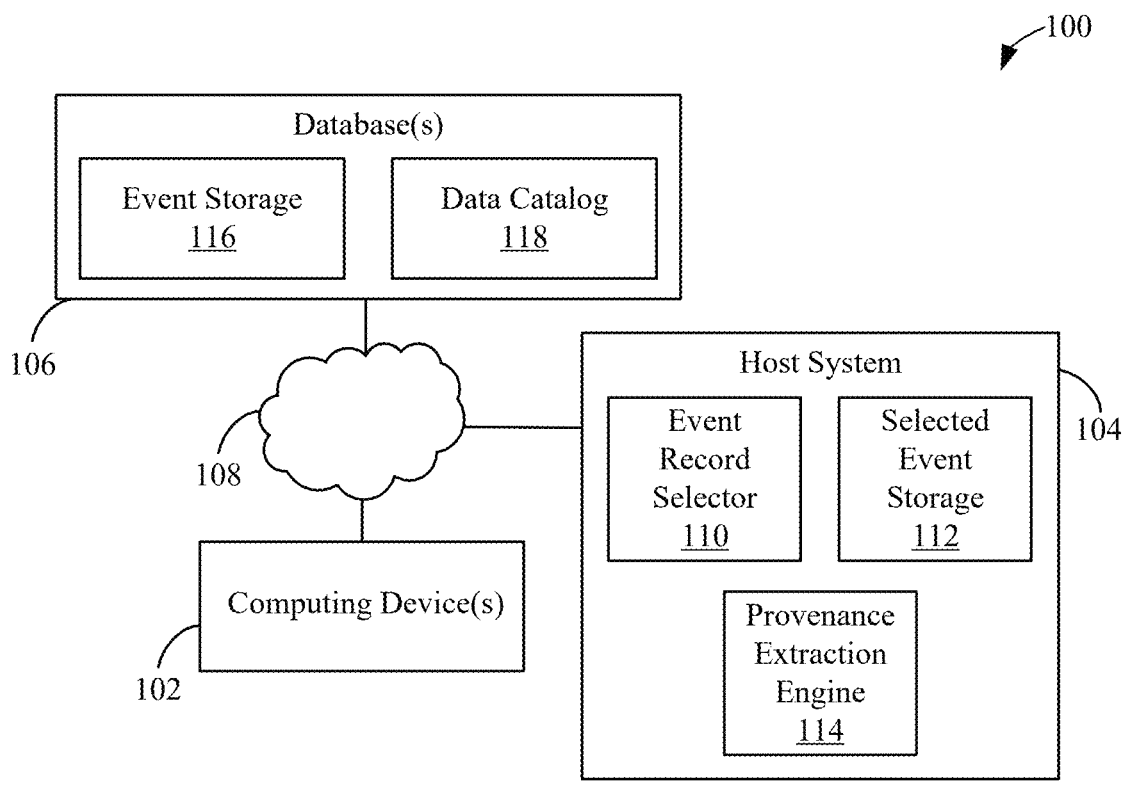
FIG. 1 is a block diagram of a system configured for efficient extraction of provenance information from database query execution logs, according to an example embodiment.

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

If the performance of an operation is described herein as being "based on" one or more factors, it is to be understood that the performance of the operation may be based solely on such factor(s) or may be based on such factor(s) along with one or more additional factors. Thus, as used herein, the term "based on" should be understood to be equivalent to the term "based at least on."

The example embodiments described herein are provided for illustrative purposes and are not limiting. The examples described herein may be adapted to any type of method or system for extracting provenance information from database query execution logs. Further structural and operational embodiments, including modifications/alterations, will become apparent to persons skilled in the relevant art(s) from the teachings herein.

Numerous exemplary embodiments are now described. Any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Provenance Extraction Embodiments

Provenance information is a type of information that can assist in answering the questions of why and how a dataset was produced, who produced it, and when it was produced. In an era where enterprise functions mandate processing data originating from multiple, potentially disparate, sources and through complicated workflows, enterprise systems may rely on provenance information across these workflows. Establishing confidence in accuracy and trustworthiness of business data, explaining analysis results and outcomes, debugging, and foreseeing the impact of data and schema mutations are only just of a few example applications that provenance information can assist in. This need for provenance information has increased with the popularity of data governance and cataloging tools, as evidenced by the growth in cloud services that facilitate the management of an up-to-date map of data assets using tools for data discovery and provenance extraction. Extracting semantically rich provenance information for enterprise use may be challenging due to complexities in workflows, costs of analysis, and inefficiencies in existing systems.

Provenance information encodes information that connects datasets, their generation process, execution details, and actors involved across a workflow. This information is utilized for a wide range of applications such as compliance, auditing, reproducibility, workload optimizations, impact analysis, and policy enforcement. However, extracting semantically rich provenance information efficiently and reliably in the context of database systems may be a non-trivial problem due to the complexity and volume of database workflows (i.e., executed queries), and limitations of accessing complete workflow information.

Provenance information management is a subfield of data and metadata management with a focus on capturing, modeling, and querying the connections between input and output data elements across a workflow. Provenance information, in the context of databases, may be classified into coarse-grained provenance information and fine-grained provenance information. Fine-grained provenance information encodes the relationships between input and output records or cells, while coarse-grained provenance information focuses on modeling relationships at a coarse level (e.g., tables and columns). Irrespective of the level of granularity, provenance information may also encode information about queries that can be at the level of query text or at the level of transformations. Embodiments of the present disclosure may be implemented to capture runtime coarse-grained provenance information in the context of database systems, although the techniques described herein can be extended to capture other types of provenance information (e.g., fine-grained provenance information). Furthermore, techniques of the present disclosure may be used to extract semantically rich provenance information from event logs in a scalable way. For instance, embodiments may identify and/or encode information from across runtime events as semantically rich provenance information while introducing optimizations to more efficiently handle high-load query workloads and focus extraction on pieces of provenance information that are of interest to upstream applications, and compressing and/or filtering out remaining noise.

Systems for extracting, managing and utilizing provenance information may be configured in various ways. For instance, such systems may include database systems, provenance extraction engines, data catalogs, and provenance applications. Database systems manage data and execute queries to retrieve and manipulate data. A provenance extraction engine in accordance with an embodiment extracts provenance information from sources related to a database system such as query execution logs or database catalogs and transforms the extracted provenance information into provenance data models (e.g., provenance graphs). The provenance data models may be modeled to serve upstream provenance applications. Data catalogs manage and serve provenance information. Provenance applications drive their logic based on the provenance information stored in the data catalog.

As described herein, embodiments and techniques of the present disclosure relate to provenance extraction in the context of database systems that manage and execute queries to retrieve and manipulate data. Such database systems may include, for example, analytical database systems, operational database systems, hybrid transactional/analytical processing (HTAP) database systems, and/or any other type of database system known to persons skilled in the relevant art(s). The database workload spectrum is wide: transactional and analytical use cases, in-database machine learning (ML) inference, reporting, etc. Independent of the use cases, the database is required to perform many input/output (I/O) operations and actions to gather, aggregate, transform and organize data. A long-standing user demand has been tracking provenance across these actions, all the way from data ingestion to data all data accesses, transformations, and optimizations. Gathering end-to-end provenance information is a pre-requisite in virtually all classes of provenance applications and the foremost step in building a catalog system.

Provenance extraction embodiments described herein have been developed based at least in part on the observation that database systems can emit query execution events at various stages of query execution. For instance, a query execution event may be emitted when a query is admitted into the database system, when a query is transformed, optimized, or otherwise manipulated, when a query is executed, and when various triggers associated with the query are invoked. Such events may be stored as query execution event records in database query execution logs. Such events may provide a comprehensive and accurate view of query execution, such as query text, query plans, username, number of records impacted, timestamps, query parameters, associated triggers, associated functions, and resource utilization. Database systems may be configured to emit query execution events to facilitate system diagnosis functionalities, troubleshooting, debugging, monitoring, billing, identifying performance regression issues, and/or the like. Provenance extraction embodiments described herein can be employed to transform these logs into information rich provenance graphs without having to make any workload modifications. Furthermore, a provenance extraction engine in accordance with an embodiment that leverages mature events technology can be agnostic to specific database engines or version and can interoperate with legacy systems deployed in production environments.

Embodiments described herein capture and analyze logs of such events to extract semantically rich provenance information. Such embodiments may be implemented in a manner that addresses certain technical challenges. These challenges may include (1) decreasing event generation overheads, (2) optimizing the extraction process to match the load of database engines, (3) filtering out and compressing provenance information, while ensuring semantics of upstream applications, and (4) ensuring resiliency to event fragmentation. Each of these challenges will now be briefly described.

Decreasing Event Generation Overheads. A database may emit hundreds of event types per query and millions of events every few minutes resulting from background system activities, side effects of query execution (e.g., triggers), or simply due to workloads with high input query load. A small performance penalty, which may vary by event type, may be incurred by the database for each event dispatch. Hence, tracking too many events can degrade query performance significantly.

Optimizing the Extraction Process to Match the Load of Database Engines. A large volume of logs can quickly overwhelm a provenance extraction engine.

Filtering Out and Compressing Provenance Information, While Ensuring Semantics of Upstream Applications. Not every query is equally important and attempting to transform all logged events into provenance information can unnecessarily overwhelm both the data catalog and the upstream provenance applications.

Ensuring Resiliency to Event Fragmentation. Database engines are typically designed to efficiently process user queries and manage data storage. Databases are typically not designed to meet the needs of provenance applications and extractors. As a result, query execution logs are rarely well-formed from a provenance extraction perspective.

A provenance extraction engine in accordance with an embodiment uses query execution logs to extract semantically rich provenance information in a manner that addresses at least the challenges noted above. For example, a provenance extraction engine in accordance with an embodiment may provide one or more of the following features.

Precise event and filter selection. Embodiments suppress event noise and redundancy to minimize database overheads and query performance degradation by tracking a relatively small set of lightweight events, while ensuring necessary information is not comprised.

State Management. The exclusion of heavyweight events may lead to a restricted view of query execution. Embodiments compensate for this restriction by managing database object states and through deduction processes.

Event Clustering and Activity Data Structure Construction. Embodiments address the void created by the exclusion by gathering information fragmented into many events to reconstruct intra-workload dependencies. In certain implementations, clustering techniques are applied to events to identify and encode intra-workload dependencies in activities into a data structure (e.g., one per activity). In an embodiment, the data structure comprises a tree data structure which may be referred to as "XRunTree."

Activity Data Structure Pruning and Compression. A provenance extraction engine embodiment detects redundant execution paths and performs pruning and compression of the activity data structure. Such optimizations may boost the efficiency of the provenance extraction engine and render it capable of transforming much higher input loads.

Optimized Provenance Data Model Generation. In accordance with an embodiment, the provenance extraction engine transforms the extracted provenance information into provenance data models (e.g., provenance graphs), stitching pieces together where needed, and optimizes the final output before populating the catalogs.

In accordance with an embodiment, a provenance extraction engine extracts semantically rich coarse-grained provenance information for executed queries from database query execution logs. The operation of a provenance extraction engine in accordance with a particular embodiment may be further understood in view of the following example assumptions and constraints, although other embodiments may operate in accordance with different assumptions and constraints.

Databases, Tables, and Schema. Assume a database D with tables $\{R_1, R_2, \ldots, R_n\}$. Each table $R_i$ comprises a set of columns corresponding to its schema $sch(R_i)=\{c_{i1}, c_{i2}, \ldots, c_{im}\}$.

Stored Procedures. Assume that database D may have a set of stored procedures $\{SP_1, SP_2, \ldots, SP_S\}$. Stored procedures may use control flow statements (e.g., IF, FOR loops, and TRY/CATCH statements), and call each other.

Query and Query Batches. Assume that each database can admit either one query or one query batch at a time. The former mode of operation indicates that a database can admit only one query at time, while the latter indicates that the database can admit one or more queries at a time.

Database Query Execution Logs. Assume that a database creates database query execution logs as a side effect of query execution. A provenance extraction engine in accordance with an embodiment may require the following semantics from a query log:

1. Entries in the log (also referred to herein as "query execution event records" or "event records") can have the following types: (1) Qstarted, indicating the start of a query and (2) Qcompleted, indicating the completion of a query. For more meaningful provenance extraction, it is also assumed that each type is annotated (either directly or by inference) with whether the query is an ad hoc query, a query that is part of a stored procedure, or part of a batch. For example, the entries in the log may contain the event types sql_statement_{started|completed} and sp_statement_{started|completed} which indicate the start and completion of ad hoc queries and queries that are part of a stored procedure, respectively. The log may also contain the event types sql_batch{started|completed}, to indicate the start and completion of batch queries. In an activity (defined below) starting with sql_batch_started and ending with sql_batch_completed, all intermediate sql_statement_{started|completed} correspond to statements executing as part of the batch (hence, it can be inferred that a statement is part of a batch without a direct annotation.)
2. Entries in the log are clustered into activities. Each activity comprises a set of Qstarted/Qcompleted events triggered for correlated queries. For instance, executing a stored procedure results in executing queries of the stored procedure. Similarly, executing a query may trigger the execution of other queries (e.g., due to the specification of triggers or due to computing statistics as part of query execution).
3. For each activity, it is assumed that events are ordered temporally following the execution in the database. It is noted, however, that different activities may temporally overlap.

Given a stream of input queries to a database along with the database query execution logs that have been generated due to the execution of these queries, a provenance extraction engine in accordance with an embodiment instantiates a semantically rich provenance data model that encodes one or more of the following: definitions of queries (e.g., query text of an ad hoc query or the definition of a stored procedure); runtime information of query runs (e.g., who executed a stored procedure, from what server and application, how many rows were output from this execution, and how much CPU time); data items residing in the database (e.g., columns or tables); data items that are exported from the database (e.g., tables that are output of ad hoc queries); dependencies between queries (e.g., a query executed as part of a stored procedure); lineage information connecting data items (e.g., columns, tables, or output tables) through queries and/or query runs; and/or lineage information aggregated at the level of stored procedures or batches from queries whose execution depends on executing these stored procedures or batches.

A provenance extraction engine in accordance with an embodiment takes advantage of a popular and reliable capability of database systems-namely, that the systems emit events to provide insights into query execution. In an embodiment, the provenance extraction engine comprises a stand-alone component that consumes such events and can be easily integrated with many different versions of the database and various user workloads as the engine does not rely on any code changes to the database or user code. A provenance extraction engine in accordance with an embodiment is designed to solve various practical and technical challenges that are unique to provenance extraction and that cannot be solved by general purpose log analyzers—e.g., analyzers that look for the most accessed tables, the slowest queries, or abnormally high I/O. Provenance extraction from logs as performed by embodiments described herein requires specialized processing that is beyond the capabilities of conventional log processors that merely map raw readings onto attributes. Challenges addressed by a provenance extraction engine in accordance with an embodiment may include (1) joining of events, (2) tracking side effects, (3) event collection overhead, (4) compression, and (5) state management overhead. Each of these challenges will now be briefly described.

Joining of Events. A database event subsystem may be used to facilitate various diagnostic functionalities. Such systems may prioritize efficient event composition and dispatch to minimize overhead. Query execution event records of such systems may carry minimal context specific information. For instance, a query execution event record may include information about query duration, count of impacted rows, query text, and/or the like. However, the query execution event record may not provide information about other queries that were executed (e.g., as part of a query batch) prior to its execution. Accordingly, individual query execution event records may only deliver a piece of information required to build complete provenance data models (e.g., provenance graphs). To address this issue, a provenance extraction engine in accordance with an embodiment is configured to identify other related events, derive missing information, and/or stitch related events together.

Tracking Side Effects. A query admitted to a database may generate one or more side effects, such as view updates, triggers, cascades, statistics computations, change data capture, and/or history tables. For such side effects, independent log messages may be emitted asynchronously. In this context, provenance information associated with all direct and indirect transformations of datasets resulting from the admission of a query may be fragmented over multiple query execution event records. Depending on the particular implementation, clustering all related events to capture and accurately model an entire activity workflow may be challenging. According to an embodiment, techniques for extracting complete provenance information may include grouping side effects by an initial query, tracking provenance information in each side effect in isolation, and tracking relationships between the initial query and its associated side effects.

Decreasing Event Collection Overhead. A database may emit hundreds of events to provide query execution insights. Emitting each event incurs a performance penalty to the database, and some events may incur much higher overheads than others. For instance, some events may have large fields (e.g., execution plans can be a few megabytes (MBs) in size), while some other events may demand extra subroutine calls (e.g., for collecting a client app name). Tracking a large number of events or tracking many events that are costly to generate can impose a significant slowdown to query execution (e.g., twice the normal query execution time), as a significant amount of database resources may need to be allocated to event management. Furthermore, if the number of events is many times more than the number of queries, the cost of event storage and the operating cost of provenance extraction engines per query may increase (e.g., beyond an acceptable limit for production use). In order to reduce the overheads of event collection, a provenance extraction engine in accordance with an embodiment targets specific low-cost query execution event records and applies efficient filters to limit the required database activity.

Compression. Provenance data models (e.g., provenance graphs) tend to grow very large over time, and this is particularly true when certain classes of queries are admitted into a database at a high rate (e.g., all SELECT queries, or INSERTs/UPDATEs in transactional workloads). Consequently, the rate of queries requiring extraction may become so large that the input rate of the data catalog system cannot keep up. However, even if the data catalog system can successfully populate the data catalog without getting flooded, the data catalog may become hard to explore due to its immense size. A provenance extraction engine in accordance with an embodiment addresses this issue by implementing compression mechanisms that will be described in more detail herein.

State Management Overhead. When a provenance extraction engine in accordance with an embodiment starts operating, the database (along with its catalogs, potential audit and trace files, query stores, etc.) and the data catalog may be in states that the engine does not know. Extraction based on events in such cases may be incomplete or even incorrect. To address this issue, a provenance extraction engine in accordance with an embodiment is bootstrapped with the current state of the database.

Efficient extraction of provenance information from database query execution logs may be implemented in various manners, in embodiments. For example, FIG. 1 is a block diagram of a system 100 configured for efficient extraction of provenance information from database query execution logs, according to an example embodiment. As shown in FIG. 1, system 100 includes a host system 104 having an event record selector 110, a selected event storage 112, and a provenance extraction engine 114 hosted and executed thereby. System 100 also includes one or more computing devices 102 and one or more databases 106. Computing device(s) 102, host system 104, and database(s) 106 may be communicatively coupled or linked to each other via a network 108.

Computing device(s) 102 are configured to execute computer programs (e.g., applications or services) that interact with database(s) 106 via network 108. For example, such computer programs may submit queries for execution by database(s) 106. Such computer programs may be executed, for example, by or on behalf of users (e.g., individual users, family users, enterprise users, governmental users, etc.) or by or on behalf of other computer programs. Computing device(s) 102 may include any number of computing devices, including ones, tens, hundreds, thousands, millions, or even greater numbers of computing devices. Each computing device 102 may comprise a stationary computing device or a mobile computing device. Examples of stationary computing devices include but are not limited to desktop computers, personal computers (PCs), and servers. Example of mobile computing device include but are not limited to a laptop computer, a notebook computer, a tablet computer, a mobile phone, a personal digital assistant (PDA), and a wearable computing device. Computer programs executing on computing device(s) 102 may interface with database(s) 106 through application programming interfaces (APIs) and/or by other mechanisms.

Database(s) 106 comprise organized collections of data stored and accessed electronically (e.g., by computing device(s) 102). Database(s) 106 may be implemented as a combination of physical hardware devices and executing software applications. Database(s) 106 may be managed by a supporting service. A supporting service may comprise for example and without limitation a cloud computing service/application and/or enterprise service/application configured to manage database(s) 106 as a database service. Examples of supporting services include but are not limited to Microsoft® Azure®, Amazon Web Services®, Google Cloud Platform™, IBM Cloud®, etc. In embodiments, database(s) 106 may include event storage 116 and data catalog 118. In embodiments, database(s) 106 may be internal and/or external to host system 104.

Event storage 116 is configured to store one or more database query execution logs. For example, queries admitted to database(s) 106 may trigger the generation of query execution event records that are stored in database query execution log(s) that comprise event storage 116. In certain embodiments, the type of store used to implement event storage 116 may be a configurable feature of database(s) 106. For instance, in accordance with an embodiment associated with Microsoft® Azure® SQL DB, the query execution event records may be known as "XEvents," and the corresponding XEvent Store may be configured as a local file system, a remote file system, or a finite memory buffer provided by database(s) 106. However, this is merely one example, and event storage 116 may be implemented in a wide variety of ways. For instance, event storage 116 may be stored outside of database(s) 106.

It is noted that conventional database engines can be configured to emit hundreds and thousands of different query execution events during query execution. However, some of these events are not even suitable for production requirements as they incur significant overheads. To address this issue, in an embodiment, database(s) 106 are configured to generate a relatively small number of low-overhead events during query execution, where the events that are generated are determined to be sufficient to accurately extract a desired amount of provenance information.

Host system 104 may comprise one or more computers/servers that host and execute event record selector 110, selected event storage 112, and provenance extraction engine 114. Host system 104 and database(s) 106 may be operated/managed by the same entity (e.g., a cloud service provider, an enterprise, or the like) or may be operated by different entities.

Event record selector 110 is configured to select query execution event records from event storage 116. For example, event record selector 110 may be configured to filter the query execution event records generated by database(s) 106 and stored in event storage 116 to generate a filtered set of event records for processing by provenance extraction engine 114. In some embodiments, event record selector 110 may store the filtered set of query execution event records in selected event storage 112 (e.g., for later processing by provenance extraction engine 114).

In one embodiment, event record selector 110 is configured to select the following event types for profiling database activity: sql_statement_starting, sql_statement_completed, sp_statement_starting, sp_statement_completed, sql_batch_starting and sql_batch_completed (these event types are also discussed above). In an implementation, one or more of these events are emitted for any query executed by the database engine, regardless of how the query was presented. For example, a query could be directly submitted by a user, can be part of a stored procedure execution, or triggered by execution of another query. As will be discussed in more detail below, processing these events enables provenance extraction engine 114 to track all data transformations taking place in the relevant database(s) 106.

Selected event storage 112 is configured to store the set of query execution event records selectively extracted by event record selector 110. Selected event storage 112 may be a local file system of host system 104, a remote file system, or a finite memory buffer, depending on the particular implementation. In some embodiments, host system 104 may not include or use event storage 112 (e.g., in a real time provenance extraction implementation).

Provenance extraction engine 114 is configured to efficiently extract provenance information from database query execution logs. For instance, provenance extraction engine 114 receives a set of query execution event records (e.g., the set of query execution records selectively extracted by event record selector 110). Provenance extraction engine 114 identifies groups of related query execution event records within the set of query execution event records and defines each identified group as an activity. Provenance extraction engine 114 generates, for each activity, an activity data structure encoding query execution dependencies for the activity. For each activity, provenance extraction engine 114 extracts runtime information from the activity data structure and lineage information from query text within the query execution event records. Provenance extraction engine 114 maps the lineage information to the runtime information for each activity to generate a provenance data model. Provenance extraction engine 114 stores the provenance data model in a data catalog, e.g., data catalog 118.

Network 108 may comprise at least one network and/or direct connection (i.e., a communication link), or any combination thereof. That is, network 108 may be any combination of the Internet, the "cloud", direct communication links, business and/or enterprise networks, and/or the like. In embodiments, network 108 is configured to communicatively couple computing device(s) 102, host system 104, and database(s) 106 to each other.

System 100 may include additional components and/or subcomponents not shown in FIG. 1 for illustrative simplicity and brevity.

Figure 2:
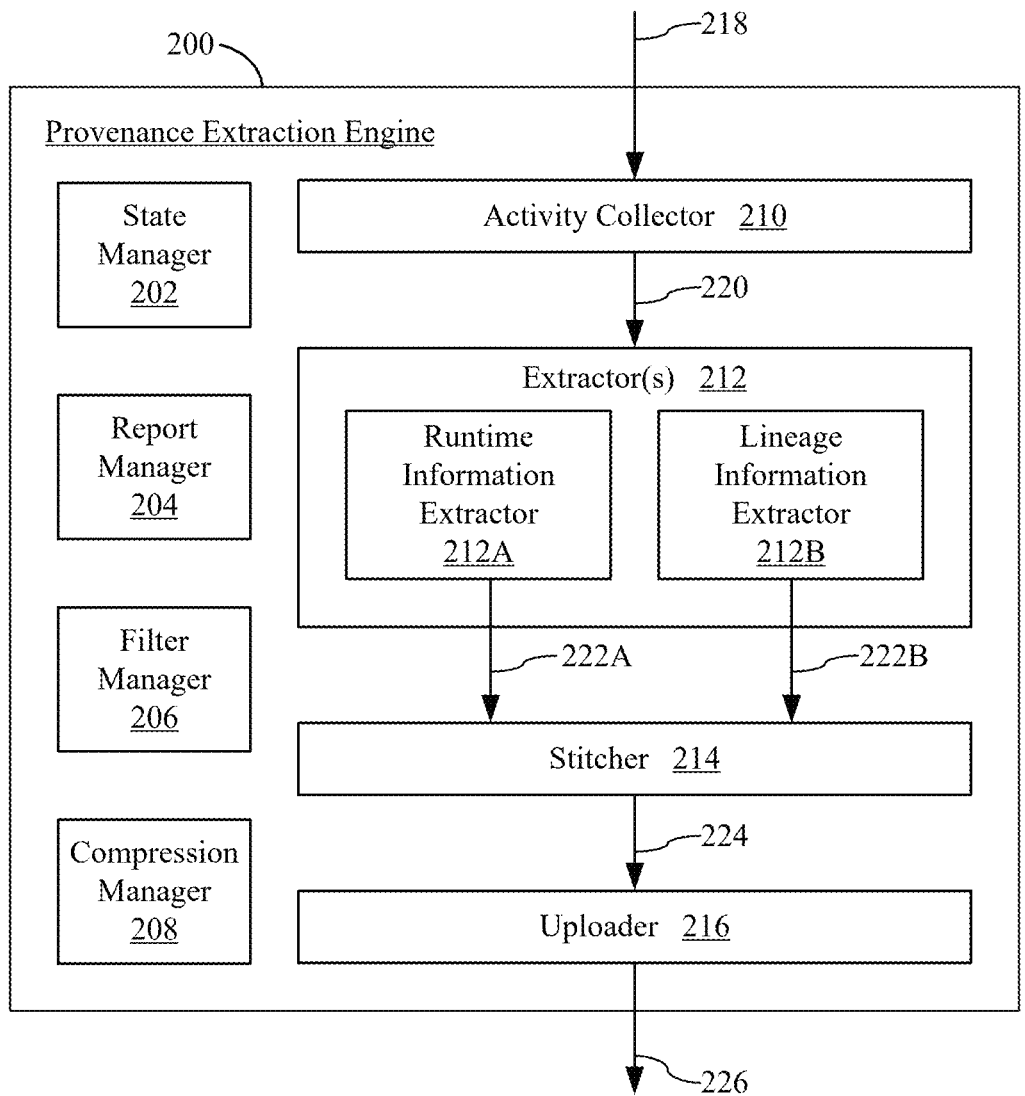
FIG. 2 is a block diagram of a provenance extraction engine for efficient extraction of provenance information from database query execution logs, according to another example embodiment.

Note that provenance extraction engine 114 of FIG. 1 may be implemented in various ways to perform its functions. For instance, FIG. 2 is a block diagram of a provenance extraction engine 200 for efficient extraction of provenance information from database query execution logs, according to another example embodiment. Provenance extraction engine 200 is a further embodiment of provenance extraction engine 114 of system 100 in FIG. 1. Provenance extraction engine 200 is described as follows.

As shown in FIG. 2, provenance extraction engine 200 includes a state manager 202, a report manager 204, a filter manager 206, a compression manager 208, an activity collector 210, one or more extractors 212, a stitcher 214, and an uploader 216. Provenance extraction engine 200 is configured to receive a set of query execution event records 218 and generate therefrom a provenance data model 226. The components of provenance extraction engine 200 shown in FIG. 2 are described in further detail as follows.

State manager 202 is configured to bootstrap components of provenance extraction engine 200 with a current state of a database. For instance, when provenance extraction engine 200 begins extracting provenance information, the database (e.g., database(s) 106 of FIG. 1) and its associated catalogs, potential audit and trace files, query stores, and/or the like may be in a state unknown to provenance extraction engine 200. Furthermore, the data catalog system (e.g., data catalog 118) may be in a state unknown to provenance extraction engine 200. In this context, extraction based on query execution event records may be incomplete or incorrect. In this scenario, state manager 202 bootstraps components of provenance extraction engine 200 (e.g., extractor(s) 212) with the current state of the database.

Report manager 204 is configured to report telemetry based on the operation of provenance extraction engine 200, systems implementing provenance extraction engine 200, and/or components thereof. For instance, report manager 204 may manage tracking of a multitude of lightweight statistics (e.g., the number of queries or the number of activities processed so far) associated with components of provenance extraction engine 200. Telemetry may be captured in various ways, including via techniques described with respect to FIG. 11 below. Telemetry reported by report manager 204 may be used for various functions, including one or more of implementing filtering optimizations, implementing compression optimizations, updating online users with a state of the overall provenance information extraction process, and/or debugging in provenance extraction engine 200 (e.g., to better respond to potential incidents).

Filter manager 206 and compression manager 208 are configured to respectively filter and compress one or more of query execution event records received and/or processed by provenance extraction engine 200, activities identified and/or processed by provenance extraction engine 200, activity data structures generated by provenance extraction engine 200, information extracted by provenance extraction engine 200, and/or provenance data models generated by provenance extraction engine 200. For instance, databases with a high load of queries may generate many query execution event records that, in turn, result in many entities (e.g., process entities or dataset entities) and relationships in a provenance data model. Depending on the particular implementation, many of such entities and/or relationships may be irrelevant to an upstream provenance application. In accordance with an embodiment, filter manager 206 and compression manager 208 may implement filter and compression logic to reduce or compress query execution event records, activities, activity data structures, entities, relationships, and/or provenance data models processed by provenance extraction engine 200. In accordance with an embodiment, filter manager 206 and/or compression manager 206 may interface with a hooking system, such as the hooking system described with respect to FIG. 11 below.

While state manager 202, report manager 204, filter manager 206, and compression manager 206 are shown as components of provenance extraction engine 200, it is possible that one or more of these components may be separate components from provenance extraction engine 200 (e.g., as components of host system 104 of FIG. 1). Furthermore, it is possible that one or more of state manager 202, report manager 204, filter manager 206, and/or compression manager 206 may be combined as a management component of provenance extraction engine 200 or host system 104.

Activity collector 210 is configured to receive a set of query execution event records 218 (e.g., from event record selector 110 or selected event storage 112 of FIG. 1) and generate one or more activity data structures 220 based thereon. For example, activity collector 210 is configured to identify groups of related query execution event records within set of query execution event records 218 and define each group as an activity. Activity collector 210 is further configured to generate an activity data structure for each activity based on the group of query execution event records associated with the activity. In embodiments, an activity may include a set of query execution events originating from queries whose execution depends on one another and an activity data structure may encode query execution dependencies for the associated activity. In some embodiments, the activity data structure may be a tree data structure encoding query execution dependencies for the activity. For instance, activity collector 210 may generate the activity data structure as a tree data structure called "XRunTree." In a non-limiting example, an XRunTree may include intra-workload dependencies for an associated activity.

In an embodiment in which activity collector 210 retrieves set of query execution event records 218 from selected event storage 114 of FIG. 1, activity collector 210 may retrieve only unprocessed query execution event records stored in selected event storage 114. Activity collector 210 may identify such unprocessed query execution event records based on timestamps associated therewith. Thus, in every run of provenance extraction engine 200 in accordance with such an embodiment, only events that were created after the last run of the engine may be processed.

Extractor(s) 212 include a runtime information extractor 212A and a lineage information extractor 212B. In some embodiments, extractor(s) 212 may include additional extractors, not shown for illustrative clarity and brevity. For instance, extractor(s) 212 may also one or more additional extractors for extracting information in addition to the runtime information and lineage information discussed below. For example, additional extractors may extend the runtime metadata and lineage information extracted as part of the provenance information extraction process. The extractors of extractor(s) 212 illustrated in FIG. 2 are described in further detail as follows.

Runtime information extractor 212A is configured to, for each activity, extract runtime information by identifying and instantiating process entities and relationships for the activity based on the group of query execution event records and the activity data structure associated with the activity. For instance, in accordance with an embodiment, runtime information extractor 212A may instantiate process entities and relationships for each activity based on activity data structures 220 received from activity collector 210 to generate runtime information 222A. In embodiments, runtime information extractor 212A analyzes, for each activity, the query execution event records and execution dependencies between queries (e.g., queries executed as part of a stored procedure) using the activity data structure.

Lineage information extractor 212B is configured to, for each activity, extract lineage information by identifying and instantiating dataset entities and their lineage relationships based on query text within the query execution event records associated with the activity. For instance, in accordance with an embodiment, lineage information extractor 212B may identify and instantiate dataset entities (e.g., tables and columns) as well their lineage relationships to generate lineage information 222B. In some embodiments, lineage information extractor 212B follows logic similar to runtime information extractor 212A, but focuses solely on analyzing the query text of queries identified in the query execution event records associated with an activity.

In accordance with an embodiment, lineage information extractor 212B may require access to the state of the database to properly output the dataset entities and lineage information. For example, for a query "SELECT C, D INTO Q FROM A, B," lineage information extractor 212B may require the schema of "A" and "B" to provide column-level lineage information explaining where "C" and "D" are coming from in the output table "Q." This information may not always be available, however, at the time of the lineage extraction. In an embodiment, lineage information extractor 212B supports both stateful and stateless lineage extraction, within the latter providing suggestions under ambiguity. In the foregoing example, the C and D are coming from either A or B. Also note that when lineage information extractor 212B is stateful, provenance extraction engine 200 is considered an authoritative source of lineage information, whereas when lineage information extractor 212B is stateless, provenance extraction engine 200 should be considered a non-authoritative source. Such non-authoritative sources should be followed by authoritative lineage information extractors to resolve ambiguities.

Stitcher 214 is configured to map lineage information to runtime information for each activity to generate a provenance data model. For instance, stitcher 214 maps lineage information 222B to runtime information 222A for each activity to generate a provenance data model 224. For example, runtime information extractor 212A instantiates process entities (e.g., queries or query runs) whereas lineage information extractor 212B identifies datasets and lineage related to the process entities. In an embodiment, stitcher 214 (1) unites the set of entities identified by runtime information extractor 212A with the dataset entities identified from lineage information extractor 212B and (2) attaches lineage semantics identified by lineage information extractor 212B to the process entities identified by the runtime information extractor 212A.

Uploader 216 is configured to store the provenance data model for use by one or more provenance applications. For instance, uploader 216 receives provenance data model 224 from stitcher 214 and stores provenance data model 224 in data catalog 118 of FIG. 1 via communication link 226. In embodiments, provenance data model 224 may comprise a semantically rich provenance data model in the form of entities (e.g., process entities and dataset entities) and related relationships extracted from a series of activities. Uploader 216 may upload provenance data model 224 to a backend provenance store of a target data catalog (e.g., data catalog 118).

Provenance extraction engine 200 may include additional components and/or subcomponents not shown in FIG. 2 for brevity and illustrative clarity.

Figure 3:
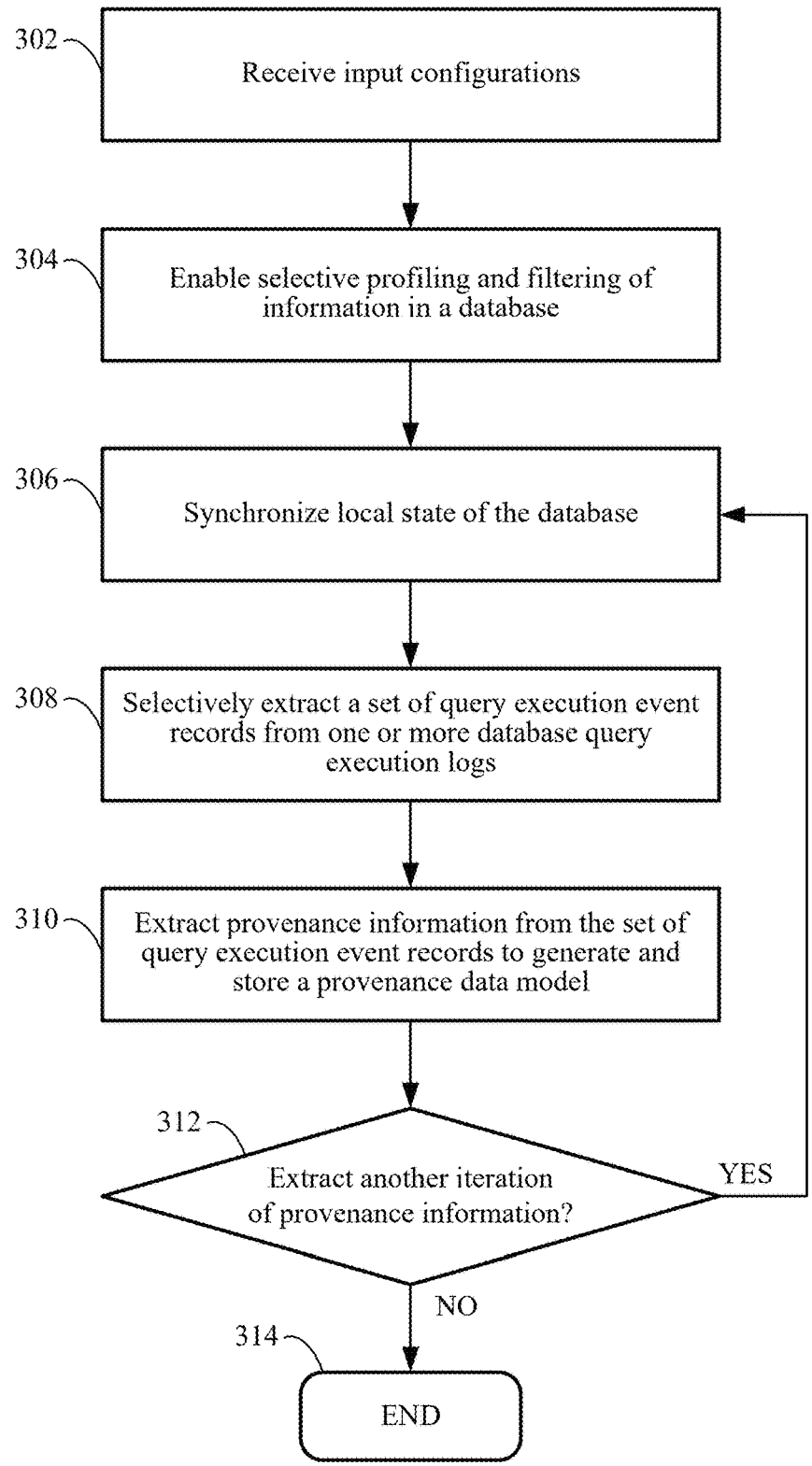
FIG. 3 is a flowchart of a process for efficiently extracting provenance information from database query execution logs, according to an example embodiment.

Note that system 100 of FIG. 1 may operate in various ways, in embodiments. For instance, FIG. 3 is a flowchart 300 of a process for efficiently extracting provenance information from database query execution logs, according to an example embodiment. In an embodiment, system 100 may operate to perform one or all of the steps of flowchart 300. Flowchart 300 is described as follows with respect to system 100 of FIG. 1. Further structural and operational embodiments will be apparent to persons skilled in the relevant art(s) based on the following description. Note that not all steps of flowchart 300 need to be performed in all embodiments.

Flowchart 300 starts at step 302. In step 302, input configurations are received. In embodiments, input configurations may be provided to one or more components of system 100, depending on the particular implementation. Input configurations may be provided by a user associated with one or more computing device(s) 102, a service provider associated with host system 104, and/or a component or subcomponent of system 100. For example, input configurations may define external connection configurations, a mode of operation, plugin configurations, and/or resource allocation configurations of a provenance extraction engine such as provenance extraction engine 200 of FIG. 2. Each of these input configurations will now be briefly described.

External Connection Configurations. In accordance with an embodiment, a provenance extraction engine may be directly or indirectly connected to one or more external systems (e.g., a database, a storage, a secret manager, telemetry, and a data catalog). An input configuration may define external connection configurations to establish connections and transfer required data. External connection configurations may include details such as URLs of external systems, client types, client versions, paths, identifiers (IDs), authentication protocol, and/or the like.

Mode of Operation Configurations. A provenance extraction engine may be configured to operate in various modes. For instance, a provenance extraction engine in accordance with an embodiment may be configured to operate in a "pull" mode or in a "push mode." In pull mode, the provenance extraction engine periodically checks for the availability of new query execution event records in the configured event storage and processes the new query execution event records as a batch. In push mode, query execution event records are received (e.g., on an entry port of provenance extraction engine 200) and processed without significant delay. Push mode may be selected, for example, when real-time extraction is desired and pull mode may be selected, for example, when the delay associated with batch processing is deemed tolerable in view of the higher cost efficiency associated with batch processing.

Plugin Configurations. In accordance with an embodiment, components of a provenance extraction engine may be implemented as interfaces called "plugins." For example, with respect to provenance extraction engine 200 of FIG. 2, activity collector 210 may be configured as a "ILogCollector" plugin, extractor(s) 212 as "IExtractor" plugins, filter manager 206 as a "IFilter" plugin, and uploader 216 as a "IUploader" plugin. Other components of provenance extraction engine 200 may be configured as plugins as well, depending on the particular implementation. Users may extend, add, remove, or otherwise modify plugins in various ways. In accordance with an embodiment, provenance extraction engine 200 receives a list of plugins to be used in the provenance extraction process as an input configuration. In such embodiments, provenance extraction engine 200 may manage the life cycle of each plugin.

Resource Allocation Configurations. The resources used by provenance extraction engine 200 may be controlled through resource allocation configurations. For example, a total number of threads, a peak memory utilization, and/or the like may be set by resource allocation configurations received in step 302 of flowchart 300.

In step 304, selective profiling and filtering of information in a database are enabled. For instance, in step 304, host system 104 of FIG. 1 may be enabled for various profiling, filtering, and/or compression functions as described elsewhere herein. For instance, event record selector 110 of FIG. 1, and/or filter manager 206 and/or compression manager 208 of FIG. 2 may be enabled by performing step 304 of flowchart 300.

In step 306, a local state of the database is synchronized. For example, state manager 202 of FIG. 2 may update extractor(s) 212 with the current state of the associated database. For instance, as described above with respect to mode of operation configurations, if provenance extraction engine 200 is operating in pull mode, the current state of the database may be unknown. In this context, state manager 202 may bootstrap extractor(s) 212 with the current state of the database to prevent incorrect or incomplete provenance information extraction.

In step 308, sets of query execution event records are selectively extracted from one or more database query execution logs. For example, execution record selector 110 of FIG. 1 is configured to selectively extract one or more sets of query execution event records from one or more database query execution logs stored in event storage 116. In some embodiments, each set of query execution event records is a subset of query execution event records stored in one or more database query execution logs. In some embodiments, execution record selector 110 is configured to store the extracted set of query execution event records as XEvents, either in a local file system of host system 104 (e.g., selected event storage 112), in a remote file system, or in a finite memory buffer.

In step 310, provenance information is extracted from the sets of query execution event records to generate and store a provenance data model. For example, provenance extraction engine 200 of FIG. 2 is configured to extract provenance information from the sets of query execution event records selected in step 308 to generate a provenance data model. In embodiments, the provenance data model may be stored in a data catalog, e.g., data catalog 118 of FIG. 1.

In step 312, a check is performed to determine if another iteration of provenance information is to be extracted. For example, in accordance with an embodiment, provenance extraction engine 200 of FIG. 2 is configured to determine if another iteration of provenance information is to be extracted. In embodiments, multiple iterations of provenance extraction may be performed as batches (e.g., in pull mode) and/or in real time (e.g., in push mode). In response to provenance extraction engine 200 determining that another iteration of provenance information is to be extracted, flowchart 300 returns to step 306 for that iteration of provenance extraction. Otherwise, flowchart 300 proceeds to step 314 where the provenance information extraction process ends.

Figure 4:
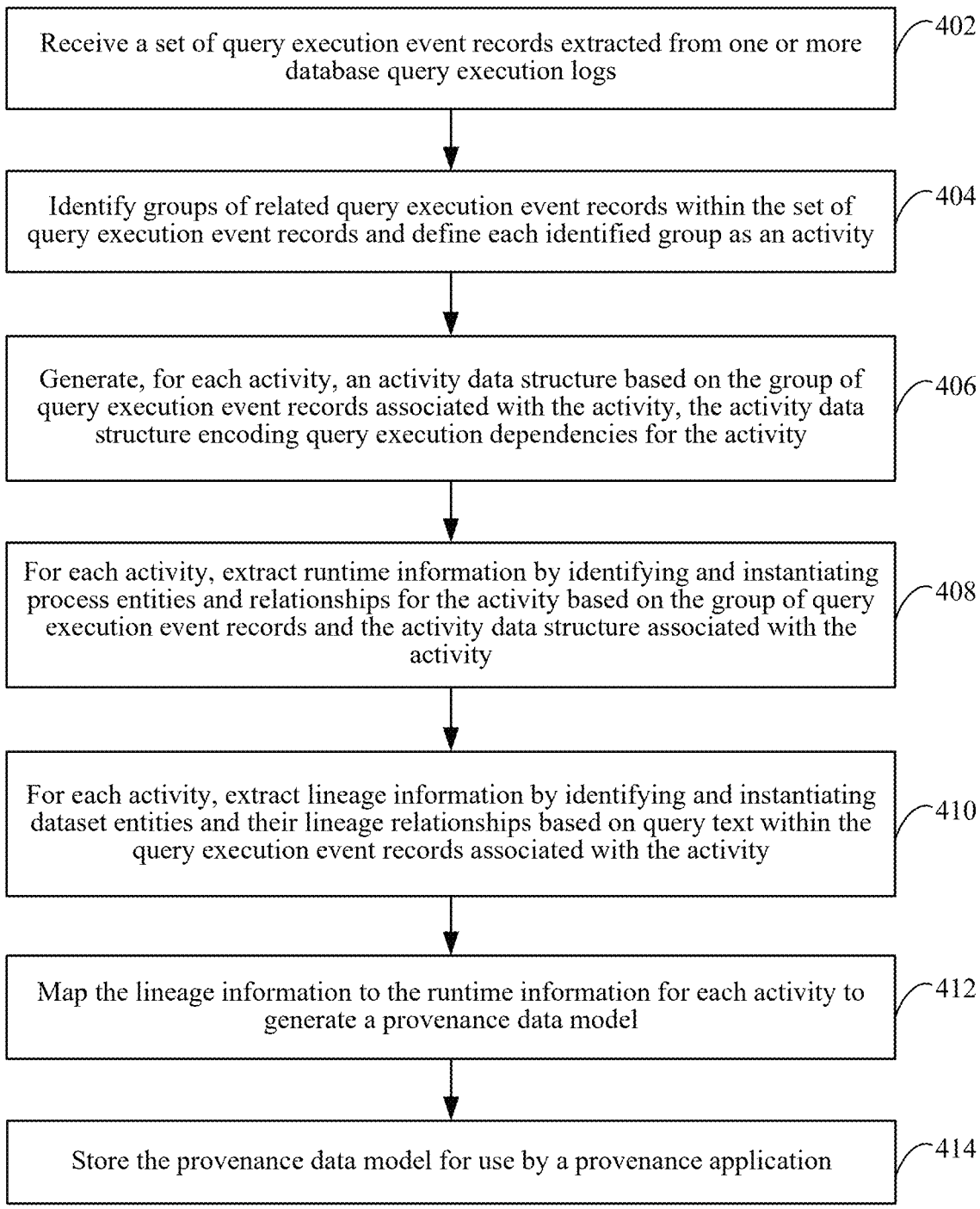
FIG. 4 is a flowchart of a process for efficiently extracting provenance information from database query execution logs, according to an example embodiment.

Note that provenance extraction engine 200 of FIG. 2 may operate in various ways, in embodiments. For instance, FIG. 4 is a flowchart 400 of a process for efficiently extracting provenance information from database query execution logs, according to an example embodiment. In an embodiment, flowchart 400 is an example process for step 310 of FIG. 3, and provenance extraction engine 200 may be configured to perform the process of flowchart 400. Flowchart 400 is described as follows with respect to FIGS. 1-3 above. Further structural and operational embodiments will be apparent to persons skilled in the relevant art(s) based on the following description. Note that not all steps of flowchart 400 need to be performed in all embodiments.

Flowchart 400 starts at step 402. In step 402, a set of query execution event records extracted from one or more database query execution logs are received. For instance, activity collector 210 of FIG. 2 is configured to receive set of query execution event records 218 selectively extracted by event record selector 110 of FIG. 1. In embodiments, activity collector 210 may be configured to receive set of query execution event records 218 in real time (e.g., from event record selector 110 when provenance extraction engine 200 is operating in push mode) or in batches (e.g., from selected event storage 112 when provenance extraction engine 200 is operating in pull mode).

In step 404, groups of related query execution event records are identified within the set of query execution event records. In embodiments, each identified group is defined as an activity. For instance, activity collector 210 of FIG. 2 is configured to identify groups of related query execution event records in set of query execution event records 218 and define each group as an activity.

In step 406, for each activity, an activity data structure is generated based on the group of query execution event records associated with the activity. In embodiments, the activity data structure encodes query execution dependencies for the corresponding activity. For instance, activity collector 210 of FIG. 2 is configured to generate, for each activity, an activity data structure based on the group of query execution event records associated with the activity. In accordance with an embodiment, activity collector 210 generates the activity data structures for each activity as one or more activity data structures 220. Each activity data structure of one or more activity data structures 220 encodes query execution dependencies for the corresponding activity. In some embodiments, activity data structures may be generated as a tree data structure (e.g., an XRunTree).

In step 408, for each activity, runtime information is extracted by identifying and instantiating process entities and relationships for the activity based on the group of query execution event records and the activity data structure associated with the activity. For instance, runtime extractor 212A of FIG. 2 is configured to extract runtime information 222A for each activity by identifying and instantiating process entities and relationships for the activity based on the group of query execution event records and the activity data structure associated with the activity.

In step 410, for each activity, lineage information is extracted by identifying and instantiating dataset entities and their lineage relationships based on query text within the query execution event records associated with the activity. For instance, for each activity, lineage information extractor 212B of FIG. 2 is configured to identify and instantiate dataset entities and their lineage relationships (e.g., lineage semantics) based on query text within the query execution event records associated with the activity. In accordance with an embodiment, lineage information extractor 212B generates lineage information 222B based on query text within the query execution event records associated with each activity.

In step 412, lineage information is mapped to the runtime information for each activity to generate a provenance data model. For instance, stitcher 214 of FIG. 2 is configured to map lineage information 222B to runtime information 222A for each activity to generate a provenance data model 224. In embodiments, stitcher 214 may generate a provenance data model for each activity and/or may generate a provenance data model for a group of activities.

In step 414, the provenance data model is stored for use by a provenance application. For instance, uploader 216 of FIG. 2 is configured to receive provenance data model 224 from stitcher 214 and store provenance data model 224 for use by one or more provenance applications. In accordance with an embodiment, provenance data models are stored in a data catalog, e.g., data catalog 118 of FIG. 1. Provenance applications may be configured to use data provenance models in various ways. For instance, an impact analysis application may be configured to use the provenance data model to determine an impact of a data asset in a data estate. As another example, a root cause analysis application may be configured to use the provenance data model to identify one or more root causes for a problem related to one or more entities.

Figure 5A:
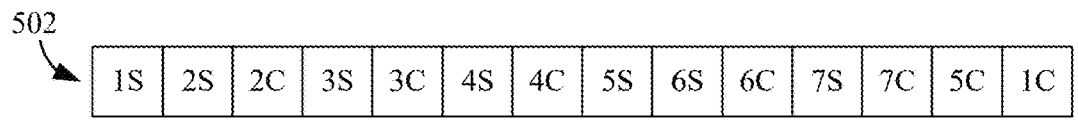
FIG. 5A depicts an example set of query execution event records used to construct an example activity data structure, according to an example embodiment.

In embodiments, sets of query execution event records may be received in various ways. For instance, FIG. 5A depicts an example set of query execution event records 502 used to construct an example activity data structure. Further structural and operational examples will be apparent to persons skilled in the relevant art(s) based on the following descriptions. FIG. 5A is described as follows with respect to provenance extraction engine 200 of FIG. 2.

As illustrated in FIG. 5A, set of query execution event records 502 includes query execution event records labeled "1S", "2S", "2C", "3S", "3C", "4S", "4C", "5S", "6S", "6C", "7S", "7C", "5C", and "1C". Set of query execution event records 502 may represent set of query execution event records 218 received by activity collector 510, as described above with respect to FIG. 2. While fourteen query execution event records are illustrated in FIG. 5A, activity collector 210 may receive any number of query execution event records including less than ten, in the tens, in the hundreds, in the thousands, or in even greater numbers, depending on the particular implementation. In embodiments, set of query execution event records 502 may be the set of query execution event records received in step 402 of flowchart 400 as described with respect to FIG. 4.

Figure 5B:
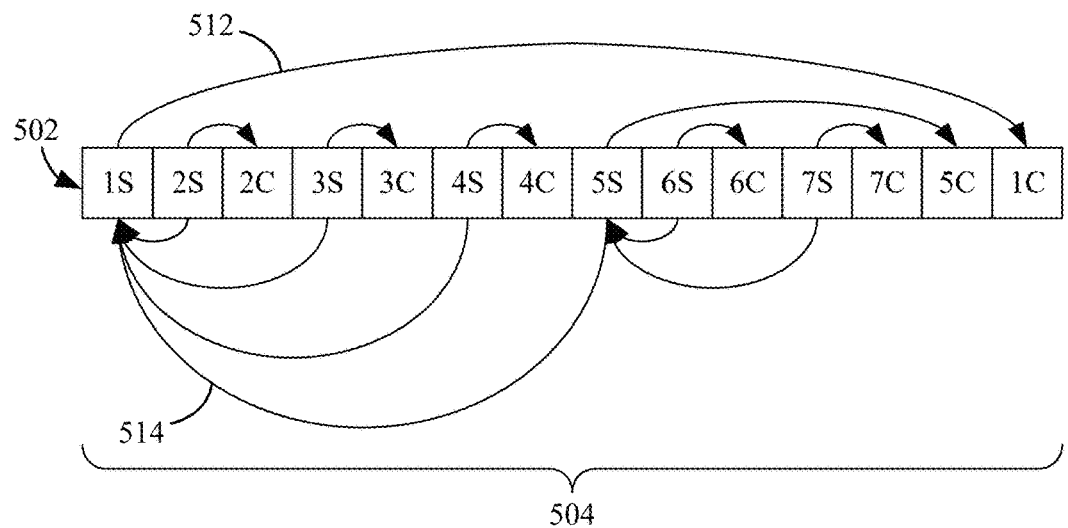
FIG. 5B depicts the example set of query execution event records of FIG. 5A annotated with begin-end guides and parent guides used to construct the example activity data structure.

In embodiments, groups of related query execution event records may be identified in various ways. For instance, FIG. 5B depicts the example set of query execution event records 502 of FIG. 5A annotated with begin-end guides and parent guides used to construct the example activity data structure. Further structural and operational examples will be apparent to persons skilled in the relevant art(s) based on the following descriptions. FIG. 5B is described as follows with respect to provenance extraction engine 200 of FIG. 2 and FIG. 5A.

As illustrated, FIG. 5B includes set of query execution event records 502 as illustrated and described with respect to FIG. 5A. FIG. 5B includes begin-end guides such as begin-end guide 512 and parent guides such as parent guide 514. Begin-end guides and parent guides may be used to understand identifying groups of related query execution event records. For example, begin-end guide 512 illustrates that query execution event record 1S is the start of a query that is completed with query execution event record 1C. In embodiments, activity collector 210 may identify query execution event records associated with the same query. In this context, activity collector 210 is configured to group query execution event records indicating a start of a query, query execution event records indicating the completion of the query, and other query execution event records associated with the query as an event node. Parent guide 514 illustrates that query execution event record 5S depends on query execution event record 1S. In embodiments, activity collector 210 may identify query execution event records that depend from other query execution event records. In this context, activity collector 210 is configured to identify groups of related query execution event records and define each identified group as an activity. For instance, activity collector 210 may identify set of query execution event records 502 as a group of related query execution event records and define the group as an activity 504. While only one activity is defined in FIG. 5B, embodiments of activity collector 210 may be configured to identify many groups of related query execution event records and to define each identified group as an activity.

Figure 5C:
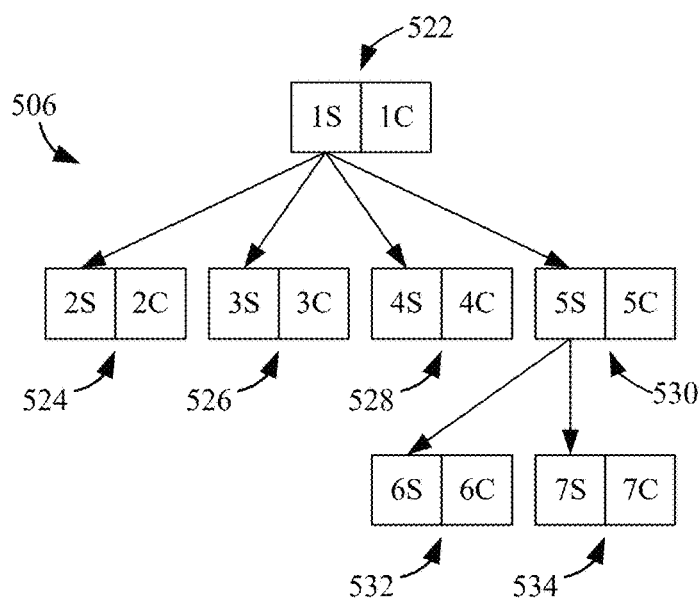
FIG. 5C depicts the example set of query execution event records of FIGS. 5A and 5B organized into the example activity data structure.

In embodiments, activity data structures may be generated in various ways. For instance, FIG. 5C depicts the example set of query execution event records 502 of FIGS. 5A and 5B organized into an example activity data structure 506. Further structural and operational examples will be apparent to persons skilled in the relevant art(s) based on the following descriptions. FIG. 5C is described as follows with respect to provenance extraction engine 200 of FIG. 2 and activity 504 of FIG. 5B.

As illustrated, in FIG. 5C query execution event records of activity data structure 506 are grouped as event nodes indicating start and completion of respective queries. For instance, query execution event records 1S and 1C are grouped as event node 522, 2S and 2C are grouped as event node 524, 3S and 3C are grouped as event node 526, 4S and 4C are grouped as event node 528, 5S and 5C are grouped as event node 530, 6S and 6C are grouped as event node 532, and 7S and 7C are grouped as event node 534. In embodiments, an event node may include any number of query execution event records associated with the same query.

In embodiments, activity collector 210 is configured to generate activity data structure 506 for activity 504 based on the group of query execution event records (e.g., query execution event records of event nodes 522-534). In embodiments, activity data structure 506 encodes query execution dependencies for activity 504. For example, activity data structure 506 illustrates execution dependencies of event nodes 522-534 on one another. For instance, as shown in FIG. 5C, execution of event node 532 depends on execution of event node 530, which depends on execution of event node 522. In FIG. 5C, activity data structure 506 is generated as a tree data structure (e.g., an XRunTree), however, it is contemplated herein that activity data structures may be generated using other types of data structure as described elsewhere herein or otherwise known.

In embodiments, logs of query execution event records may be analyzed in various ways. For instance, FIG. 6 depicts an example set of query execution event records 600 associated with example activities. Further structural and operational examples will be apparent to persons skilled in the relevant art(s) based on the following descriptions. Set of query execution event records 600 is described as follows with respect to system 100 of FIG. 1.

Sets of query execution event records such as set of query execution event records 600 may be generated as the result of executing one or more queries, query batches, stored procedures, workloads, and/or the like, in embodiments. For instance, set of query execution event records 600 may be generated by executing the example script as described herein as follows:

```
CREATE PROCEDURE CleanAndAppendSalesHistory
    @trackingSystemVersion int
AS
BEGIN
    if @trackingSystemVersion = 1
        BEGIN
            INSERT SalesHistory
                SELECT c.CustomerId, c.Region, r.Rate * c.Amount as Amount
                FROM StagedSales c JOIN ConversionRate r ON c.Region =
                    r.Region
        END
    ELSE
        BEGIN
            INSERT SalesHistory SELECT * FROM StagedSales
        END
END
GO
CREATE PROCEDURE SyncNewSales
    @trackingSystemVersion [int]
```

-continued

```
AS
BEGIN
    IF EXISTS(Select * FROM INFORMATION_SCHEMA.TABLES
        WHERE name='StagedSales')
        DROP TABLE StagedSales;
    BULK INSERT StagedSales FROM 'newSales.csv';
    EXECUTE CleanAndAppendSalesHistory @trackingSystemVersion;
END
GO
EXECUTE SyncNewSales 2;
```

The above script represents a workload executed in a database system. Query execution event records are generated in response to execution of the script. As shown in FIG. 6, set of query execution event records 600 includes query execution event records that indicate the start and completion of queries associated with the above script. In this example, set of query execution event records 600 represents a set of query execution records selected by an event record selector, such as event record selector 110 of FIG. 1.

Set of query execution event records 600 and the above example workload illustrate a running example implementation of a database system (e.g., system 100 of FIG. 1) and a provenance extraction engine (e.g., provenance extraction engine 200 of FIG. 2). The running example is described as follows. In the running example, sales are recorded in one or more online transaction processing (OLTP) database engines ("OLTP engines" hereafter) and periodically transferred to an online analytical processing (OLAP) engine ("OLAP engine" hereafter). New sales are recorded in a csv file "newSales.csv". The OLAP engine is configured to read and append newSales.csv in a table that tracks sales' history. OLTP engines may differ in schema and semantics of the sales they track and dump into this csv file. In the running example, the OLAP engine records the amount of each sale before converting to a universal currency (e.g., to simplify analytics and provide meaningful insights). As such, the OLAP engine converts to a universal schema (e.g., by converting each recorded amount to the universal currency) before appending to the sales history table. It is also contemplated herein that, in embodiments, OLTP engines may be configured to track sales in the universal currency.

In the running example, two stored procedures are used in the OLAP engine: "SyncNewSales" and "CleanAndAppendNewSalesHistory." SyncNewSales and CleanAndAppendNewSalesHistory are described as follows.

SyncNewSales. In the running example, SyncNewSales is a stored procedure that first inserts the content of newSales.csv into a staging table, "StagedSales". In this example, SyncNewSales checks if StagedSales already exists and, if so, deletes any prior content before insertion. An input to SyncNewSales is the version of the OLTP engine, labeled "@trackingSystemVersion", that the newSales.csv file is coming from. Given @trackingSystemVersion, the SyncNewSales stored procedure then executes the CleanAndAppendNewSalesHistory stored procedure by passing @trackingSystemVersion as an input.

CleanAndAppendNewSalesHistory. In the running example, CleanAndAppendNewSalesHistory is a stored procedure configured to append the sales from the StagedSales table to a sales history table, "SalesHistory". In this example, CleanAndAppendNewSalesHistory converts sales to the universal schema expected by SalesHistory. To do so, CleanAndAppendNewSalesHistory checks the version of the system that newSales.csv is coming from (e.g., as defined by the input @trackingSystemVersion), and performs the conversion accordingly (i.e., if the version is 1, the sales are coming from an OLTP engine that is not converting to a universal currency and, as such, CleanAndAppendNewSalesHistory converts the sales amount to the universal currency before appending to the sales history; if the version is not 1, CleanAndAppendNewSalesHistory appends the sales directly to the history table).

As shown in the example script above, SyncNewSales is executed with version @trackingSystemVersion=2 in the running example. In this context, CleanAndAppendNewSalesHistory appends the sales directly to the history table. After executing SyncNewSales with version @trackingSystemVersion=2, a set of query execution records are generated and stored in one or more database query execution logs, which may be stored in a data storage (e.g., event storage 116 of FIG. 1). In this running example, set of query execution event records 600 are selectively extracted from the one or more database query execution logs (e.g., by event record selector 110 of FIG. 1).

As illustrated in FIG. 6, set of query execution event records include activity ID, event type, and query text for each query execution event record. However, it is contemplated herein that other metadata may be included in or otherwise associated with each query execution event record (e.g., timestamp indicating the time the query was fired, CPU time for executing the query, on whose behalf a query was executed, and others, depending on the implementation).

In the running example, the execution of SyncNewSales is tracked. In this example, knowing the value of the parameter is sufficient to know which control paths of the procedure will be executed; however, this information is not enough to determine the number of rows that will be impacted, the query execution status, or if any registered triggers will be invoked. In accordance with an embodiment, a provenance extraction engine (e.g., provenance extraction engine 200 of FIG. 2) is configured to track all consequences of the workload execution (e.g., queries, side-effects (e.g., triggers), parameters, impacted datasets, and runtime information) to generate a semantically rich provenance data model for use by provenance applications. The running example is further described with respect to FIGS. 7-10 as follows.

Figure 7:
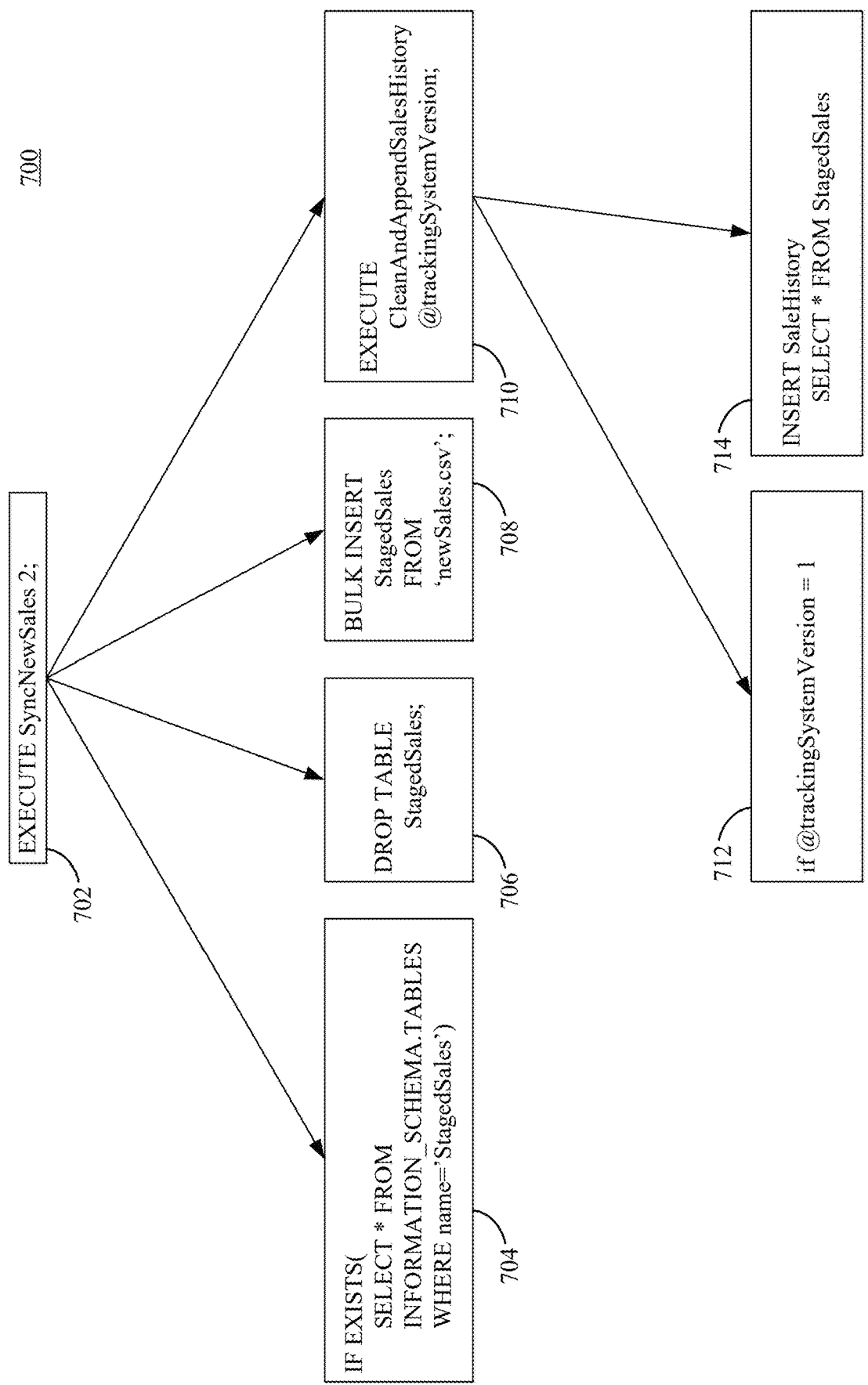
FIG. 7 depicts an example activity data structure corresponding to the example set of query execution event records shown in FIG. 6.

In embodiments, activity data structures may be organized in various ways. For instance, FIG. 7 depicts an example activity data structure 700 corresponding to the example set of query execution event records shown in FIG. 6. Activity data structure 700 may be a further example embodiment of activity data structure 506 of FIG. 5C. Further structural and operational examples will be apparent to persons skilled in the relevant art(s) based on the following descriptions. Activity data structure 700 is described as follows with respect to system 100 of FIG. 1, provenance extraction engine 200 of FIG. 2, and set of query execution event records 600 of FIG. 6.

As described above with respect to FIG. 6, in the running example, executing "EXECUTE SyncNewSales 2" results in the query execution event records of set of query execution event records 600 with an Activity ID of 3. In accordance with an embodiment, activity collector 210 of FIG. 2 defines the group of query execution event records as an activity with an Activity ID of 3. Activity collector 210 generates activity data structure 700 based on the group of query execution event records associated with Activity ID 3. As shown in FIG. 7, activity data structure 700 includes event nodes 702, 704, 706, 708, 710, 712, and 714. Each event node corresponds to query execution event records of set of query execution event records 600 indicating the start and completion of associated queries or stored procedures. In this example, event node 702 is a parent node denoting the "EXECUTE SyncNewSales 2" query execution. Event nodes 704-714 are children nodes associated with queries executed as part of SyncNewSales. In particular, event nodes 704-710 are children nodes associated with queries executed as part of SyncNewSales, and event nodes 712 and 714 are children nodes associated with queries executed as part of CleanAndAppendSalesHistory, which is called by event node 710.

As discussed herein, activity data structures encode query execution dependencies for an associated activity. For instance, activity data structure 700 encodes query execution dependencies for the activity with Activity ID 3. In the running example, every node tracks metadata available in the events the node originated from. For example, event node 702 tracks all metadata available in corresponding query execution event records of set of query execution event records 600, "sql_statement_started" and "sql_statement_completed."

Figure 8:
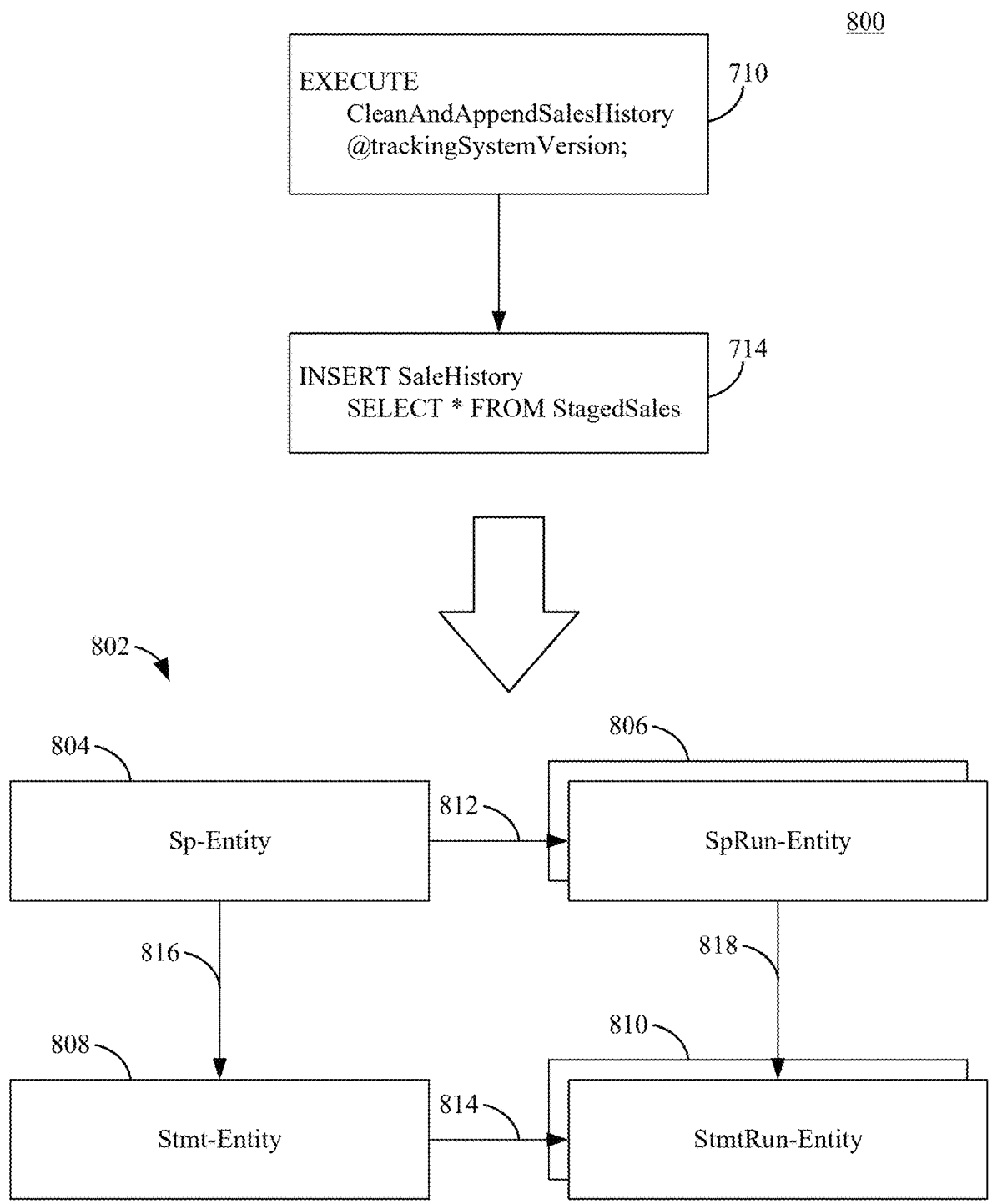
FIG. 8 depicts an example of runtime information extraction based on a portion of the example activity data structure of FIG. 7.

In embodiments, runtime information may be extracted in various ways. For instance, FIG. 8 depicts an example of runtime information extraction 800 ("Runtime extraction 800" herein) based on a portion of the example activity data structure of FIG. 7. Further structural and operational examples will be apparent to persons skilled in the relevant art(s) based on the following descriptions. Runtime extraction 800 is described as follows with respect to provenance extraction engine 200 of FIG. 2 and activity data structure 700 of FIG. 7.

As described above, runtime extraction 800 may be used for understanding techniques for extracting runtime information from an activity data structure. For instance, runtime extraction 800 includes event nodes 710 and 714 of activity data structure 700 as described with respect to FIG. 7. Runtime information may be extracted from event nodes 710 and 714 in various ways. For instance, runtime information extractor 212A of FIG. 2 may be configured to identify and instantiate process entities and relationships for event nodes 710 and 714 based on event nodes (e.g., the group of query execution event records) of activity data structure 700 and activity data structure 700. For instance, runtime information extractor 212A may analyze query execution event records associated with event nodes 710 and 714, as well as execution dependencies between event nodes 710 and 714, and other nodes of activity data structure 700 (not shown for illustrative clarity and brevity).

For instance, as shown in FIG. 8, runtime information extractor 212A analyzes event nodes 710 and 714 and produces runtime information 802. Runtime information 802 includes process entities (e.g., query entities and query run entities) and relationships between process entities. For instance, in the running example, runtime information extractor 212A analyzes event node 714 to generate a query run entity 810. Query run entity 810 records run attributes such as execution timestamp, impacted row count, and other run attributes of executing event node 714, as described elsewhere herein or otherwise known. Runtime information extractor 212A also generates a relationship 814 between query run entity 810 and a query entity 808 (including generating query entity 808 if it is not already generated). This relationship records executions of the query associated with event node 714 (e.g., all executions of the query "INSERT SaleHistory SELECT*FROM StagedSales"). In some implementations, a query may be executed multiple times. In the running example, further analysis of the origin of the query associated with event node 714 indicates that the query belongs to a query associated with event node 710. In this scenario, runtime information extractor 212A generates a relationship 816 between query entity 808 and query entity 804.

Furthermore, runtime information extractor 212A analyzes event node 710 to generate a query run entity 806. Query run entity 806 records run attributes associated with executing event node 710. Runtime information extractor 212A also generates a relationship 812 between query run entity 806 and query entity 804, and a relationship 818 between query run entity 810 and query run entity 806.

Runtime information extractor 212A generates process entities and relationships for each node in activity data structure 700 (not shown for brevity and illustrative clarity). In this context, runtime information extractor 212A is configured to identify and instantiate process entities and relationships for the activity based on the group of query execution event records and the activity data structure associated with the activity.

Figure 9:
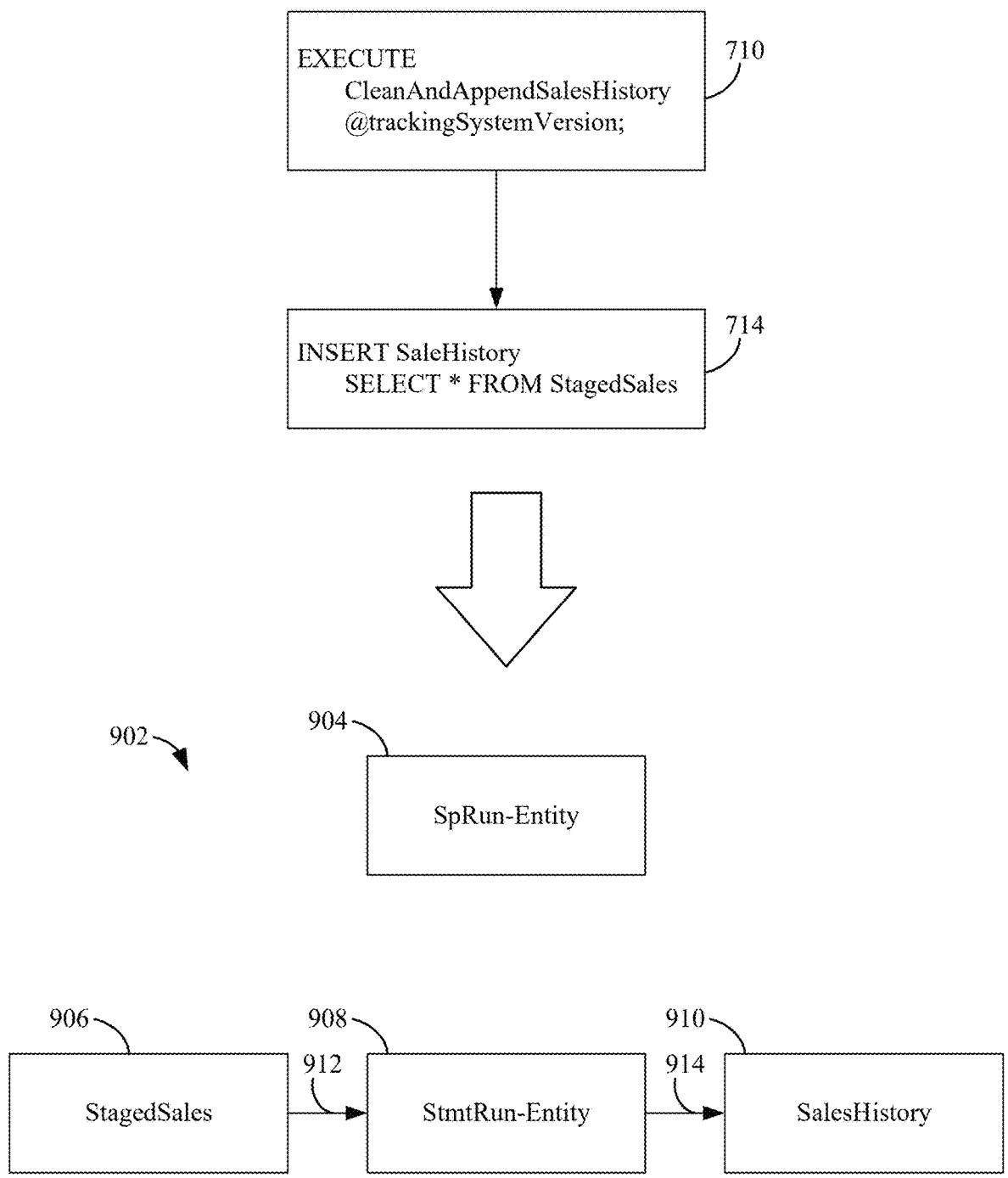
FIG. 9 depicts an example of lineage information extraction based on the portion of the example activity data structure of FIG. 7.

In embodiments, lineage information may be extracted in various ways. For instance, FIG. 9 depicts an example of lineage information extraction ("Lineage extraction 900" herein) based on the portion of the example activity data structure of FIG. 7. Further structural and operational examples will be apparent to persons skilled in the relevant art(s) based on the following descriptions. Lineage extraction 900 is described as follows with respect to provenance extraction engine 200 of FIG. 2 and activity data structure 700 of FIG. 7.

As described above, lineage extraction 900 may be used for understanding techniques for extracting lineage information from query text. For instance, lineage extraction 900 includes event nodes 710 and 714 of activity data structure 700 as described with respect to FIG. 7. Lineage information may be extracted from event nodes 710 and 714 in various ways. For instance, lineage information extractor 212B of FIG. 2 may be configured to identify and instantiate dataset entities and their relationships for event nodes 710 and 714 based on query text within the event nodes associated with Activity 3. In the running example, lineage information extractor 212B may analyzes query execution event records associated with event nodes 710 and 714 and other nodes of activity data structure 700 (not shown for illustrative clarity and brevity).

For instance, as shown in FIG. 9, lineage information extractor 212B analyzes the query text of queries associated with event nodes 710 and 714 and produces lineage information 902. Lineage information 902 includes dataset entities (e.g., query entities and data entities) and relationships between dataset entities. For instance, lineage information extractor 212B analyzes the query text "INSERT SalesHistory SELECT*FROM StagedSales" of the query associated with event node 714 to generate query entity 908, data entity 906, and data entity 910. In this example, lineage information 212B also generates relationship 912 between data entity 906 and query entity 908, and generates relationship 914 between query entity 908 and data entity 906. In the running example, lineage information extractor 212B analyzes the query text "EXECUTE CleanAndAppendSalesHistory @trackingSystemVersion" of the query associated with event node 710 to generate query entity 904. However, in this example, lineage information extractor 212B does not generate relationships (e.g., data flow relations) associated with query entity 904, as the associated query itself does not cause any data flow.

Figure 10:
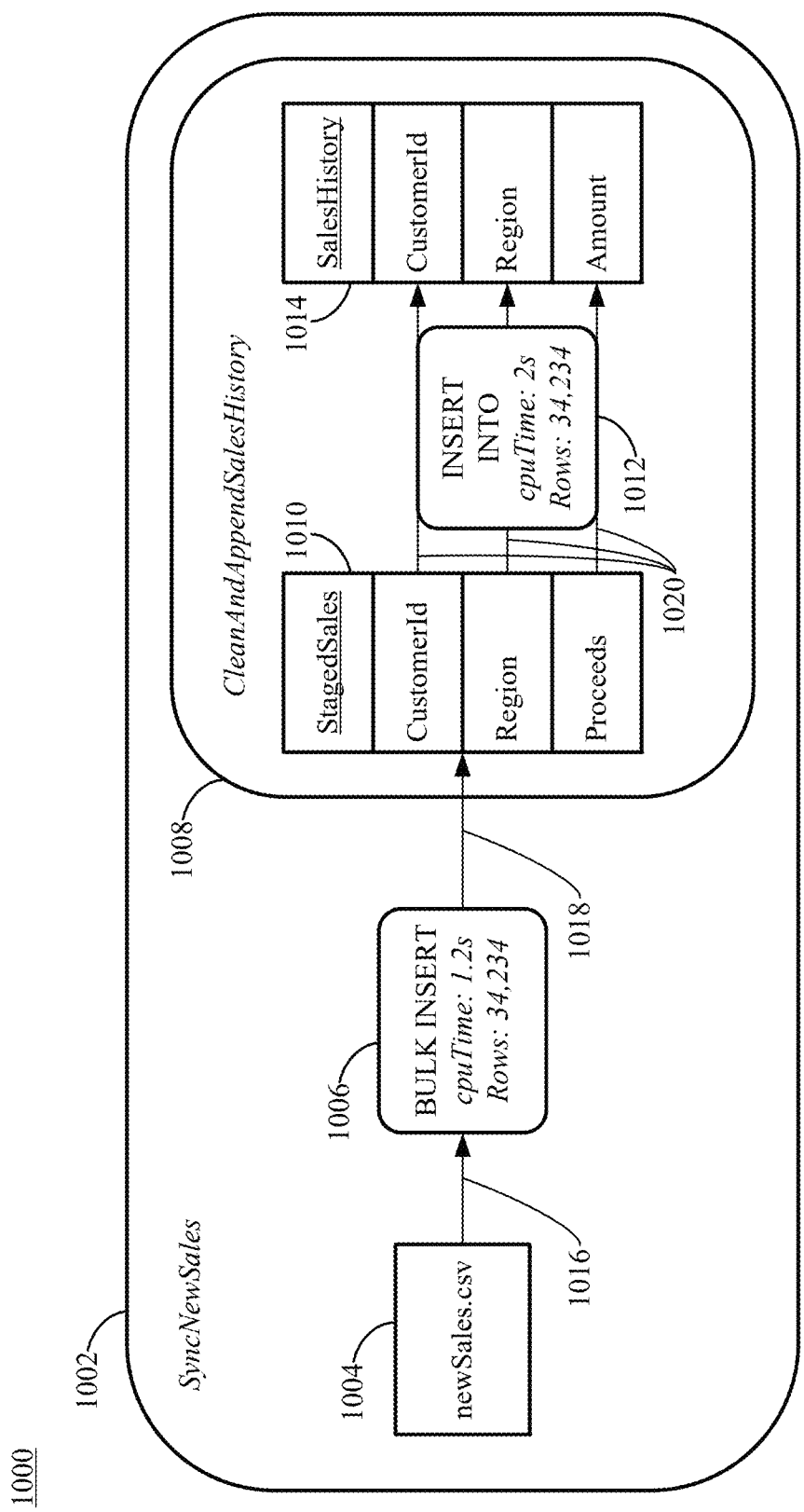
FIG. 10 depicts an example provenance data model that may be generated by an example embodiment.

In embodiments, provenance data models may be generated in various ways. For instance, FIG. 10 depicts an example provenance data model 1000 that may be generated by an example embodiment. Further structural and operational examples will be apparent to persons skilled in the relevant art(s) based on the following descriptions. Provenance data model 1000 is described as follows with respect to provenance extraction engine 200 of FIG. 2, set of query execution event records 600 of FIG. 6, activity data structure 700 of FIG. 7, runtime extraction 800 of FIG. 8, and lineage extraction 900 of FIG. 9.

Provenance data model 1000 is a provenance data model associated with the running example described with respect to FIGS. 6-9 above. Provenance data model 1000 may be generated as part of step 412 of flowchart 400 as described with respect to FIG. 4. In the running example, stitcher 214 of FIG. 2 is configured to generate provenance data model 1000. In embodiments, stitcher 214 may map lineage information, such as lineage information 902 of FIG. 9, to runtime information, such as runtime information 802 of FIG. 8 to generate provenance data model 1000.

Provenance data model 1000 is an example of a semantically rich provenance data model for use by a provenance application, with respect to the running example. Provenance data model 1000 illustrates a detailed view of the execution of SyncNewSales with @trackingSystemVersion=2. As shown in FIG. 10, provenance data model 1000 includes parent model entity 1002.

Parent model entity 1002 represents the execution of stored procedure SyncNewSales with @trackingSystemVersion=2. As shown in FIG. 10, parent model entity 1002 includes a data entity 1004, a model entity 1006, a model entity 1008, and corresponding dependencies 1016 and 1018. For instance, dependency 1016 indicates a dependency of model entity 1006 on data entity 1004 and dependency 1018 indicates a dependency of model entity 1008 on model entity 1008. Data entity 1004 represents the newSales.csv file. Model entity 1006 includes details such as query process type (e.g., BULK INSERT) and runtime information (e.g., a CPU execution time of 1.2 seconds and an update to 34,234 rows).

Model entity 1008 represents the execution of stored procedure CleanAndAppendSalesHistory having received @trackingSystemVersion=2 as an input. As shown in FIG. 10, model entity 1008 includes data entity 1010, model entity 1012, data entity 1014, and mappings 1020. Data entity 1010 represents the StagedSales table and data entity 1014 represents the SalesHistory table. Model entity 1012 includes details such as query process type (e.g., INSERT INTO) and runtime information (e.g., a CPU execution time of 2 seconds and an update to 34,234 rows). Mappings 1020 illustrate mappings of columns of data entity 1010 to columns of data entity 1014. For instance, columns "CustomerId", "Region", and "Proceeds" of StagedSales are mapped to columns "CustomerId", "Region", and "Amount" of Sales History, respectively.

Thus, embodiments and techniques for efficient extraction of provenance information from database query execution logs have been described with respect to a running example as illustrated and described with respect to FIGS. 6-10. Provenance data models such as provenance data model 1000 of FIG. 10 may be stored in a data catalog (e.g., data catalog 118 of FIG. 1) for use by one or more provenance applications. Certain non-limiting examples of provenance applications that may use a provenance data model are described as follows.

Impact Analysis Application. One example of a provenance application is an impact analysis application. Impact analysis applications may be configured to analyze the impact of a data asset on a data estate. In this context, an impact analysis application may determine how a data asset (e.g., a file, a table, or a column) in a provenance data model affects other data assets. For instance, with respect to provenance data model 1000, an impact analysis application may determine that SalesHistory.Region (i.e., column "Region" in table SalesHistory) is derived from StagedSales.Region (i.e., column "Region" in table StagedSales) from an analysis of model entity 1008 (i.e., CleanAndAppendNewSalesHistory). In an example database implementation, a database administrator (e.g., a user) may want to change the type of column of StagedSales.Region. The database administrator may use an impact analysis application to determine the impact of the desired change. In this context, the impact analysis application may indicate a change in the injection rate of or a potential corruption of stored procedure CleanAndAppendNewSalesHistory. In an example compliance implementation, an auditor (e.g., a user) may determine the existence of personally identifiable information (PII) in the table StagedSales. In this context, the impact analysis application may be used to identify tables that are related to StagedSales (e.g., SalesHistory) for further investigation.

Root Cause Analysis Application. Another example of a provenance application is a root cause analysis application. In cloud service applications, data-format related incidents may be a source of bugs. In this context, debugging is used to mitigate and resolve incidents. Root cause analysis applications may be configured to identify root causes for a problem related to entities using provenance information. For instance, in the example database implementation described with respect to the impact analysis application above, the database administrator may perform the change irrespective of the impact. Continuing this example, a second database administrator oversees an extract, transform, and load (ETL) process performed by SyncNewSales and CleanAndAppendNewSalesHistory with respect to table SalesHistory. In this example, the ETL process does not execute properly to ingest data. The second database administrator uses a root cause application during mitigation to determine the root cause of the problem (i.e., the change in data type of column StagedSales.Region in this example). In this example, the root cause is identified (i.e., the change by the first database administrator), and the second database administrator may contact the first database administrator for resolution and/or mitigation.

While provenance applications have been described with respect to impact analysis applications and root cause analysis applications, it is contemplated herein that other types of provenance applications may use provenance data models such as provenance data model 1000 of FIG. 10.

III. Example Filter and Compression Embodiments

As described above, a database system may emit many event types per query and many query execution events over a period of time. For instance, a database may emit hundreds of event types per query and millions of query execution events every few minutes. Many query execution event records and relationships may not be relevant to provenance applications, depending on the particular implementation. In some embodiments, filter and/or compression techniques may be used to remove query execution event records, activities, and/or event nodes from further processing by the provenance extraction engine.

Embodiments and techniques described herein may be used to filter and/or compress provenance information in various ways. For instance, in accordance with an embodiment, extractor(s) 212 of FIG. 2 are configured to detect redundant execution paths in an activity data structure. In this context, the activity data structure (e.g., an XRunTree) may be pruned to increase extractor efficiency. Furthermore, by pruning the activity data structure, provenance extraction engine 200 may be capable of transforming higher input loads of query execution event records.

Figure 11:
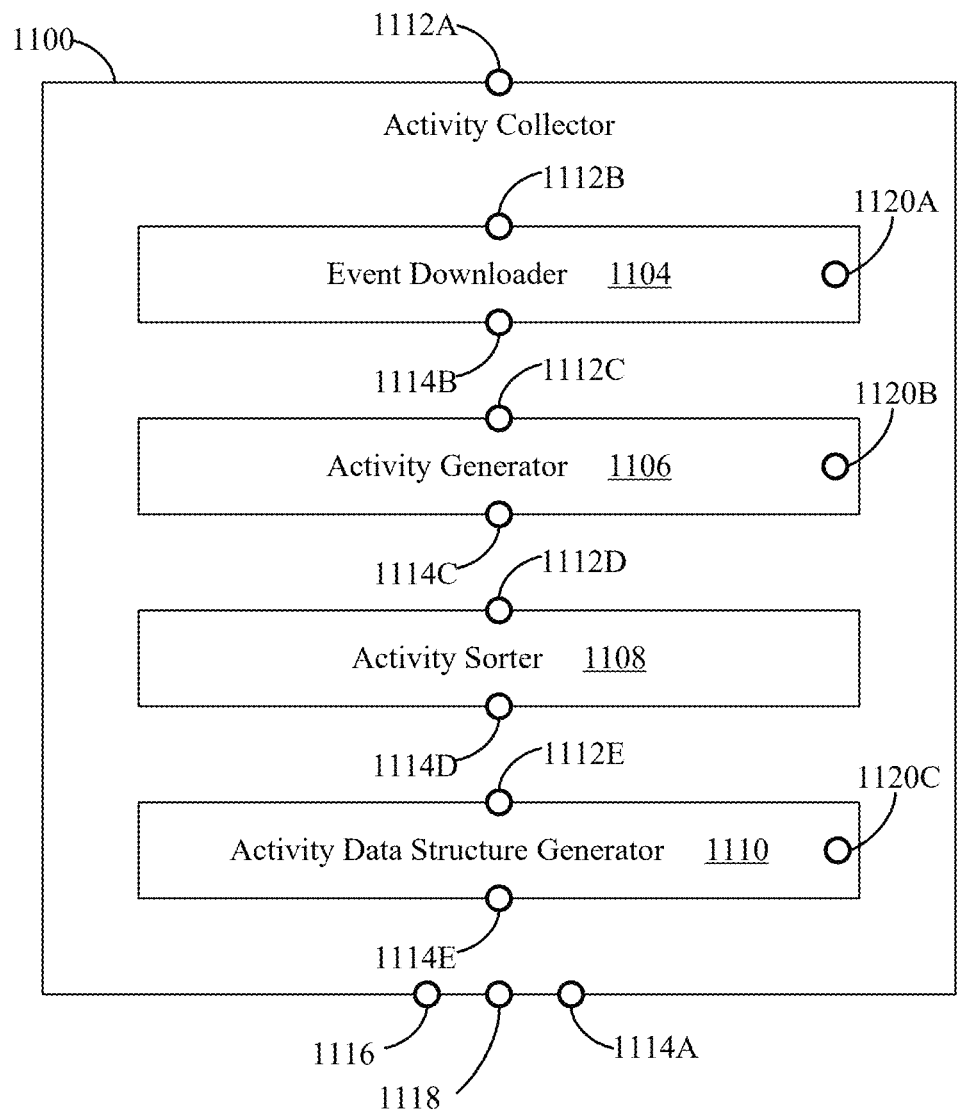
FIG. 11 is a block diagram of an activity collector having points for injecting logic for filtering, compression, and reporting telemetry, according to an exemplary embodiment.

In accordance with an embodiment, a hooking system may be used to implement filtering, compression, and reporting telemetry techniques. For example, FIG. 11 is a block diagram of an activity collector 1100 having points for injecting logic for filtering, compression, and reporting telemetry, according to an exemplary embodiment. Activity collector 1100 is a further embodiment of activity collector 210 of FIG. 2. Further structural and operational examples will be apparent to persons skilled in the relevant art(s) based on the following descriptions. Activity collector 1100 is described as follows with respect to provenance extraction engine 200 of FIG. 2 and flowchart 400 of FIG. 4.

As shown in FIG. 11, activity collector 1100 includes an event downloader 1104, an activity generator 1106, an activity sorter 1108, and an activity database structure generator 1110. Event downloader 1104 is configured to receive query execution event records (e.g., set of query execution event records 218 of FIG. 2) (e.g., by downloading query execution event records from selected event storage 112 of FIG. 1). Activity generator 1106 is configured to identify groups of related query execution event records and define each group as an activity (e.g., by parsing and deserializing query execution event records into activities). Activity sorter 1108 is configured to sort activities received from activity generator 1108 (e.g., temporally). Activity database structure generator 1110 generates, for each activity, an activity data structure (e.g., an XRunTree) based on the group of query execution event records associated with the activity. In accordance with an embodiment, activity collector 110 is configured to send identified activities to extractor(s) 212 of FIG. 2.

In accordance with an embodiment, the provenance information extraction process is scalable to high workloads while maintaining semantics of upstream provenance applications. As described above, filters and compressors may be implemented across the various components of provenance extraction engine 200 of FIG. 2 to scale to high workloads. Depending on the particular implementation, filter and compression logic may be a cross-cutting concern to the provenance information extraction logic. In an embodiment, a hooking system exposes points in the logic of the components of provenance extraction engine 200 to inject cross-cutting logic. Each point is associated with the state of the components the injected logic may alter. For instance, activity collector 1100 and its components include start points 1112A, 1112B, 1112C, 1112D, and 1112E ("start points 1112" collectively), end points 1114A, 1114B, 1114C, 1114D, and 1114E ("end points 1114" collectively), result point 1116, return point 1118, and loop points 1120A, 1120B, and 1120C ("loop points 1120" collectively). In embodiments, points represent an exposed access point in the logic of a component (e.g., activity collector 1100) or a sub-component (e.g., event downloader 1104, activity generator 1106, activity sorter 1108, and activity database structure generator 1110). Points may be used in a hooking system for filtering, compressing, reporting, and other processes for cross-cutting logic injection. For instance, points may be used by report manager 204 for generating reports, filter manager 206 for filtering, compression manager 208 for compression, and/or other components and/or subcomponents of provenance extraction engine 200.

Points may be associated with particular types of logic that may be inserted or parts of a process that may receive and/or generate information. For instance, start points correspond to the start of a process performed by an associated component. End points correspond to the end of a process performed by an associated component. Result points corresponds to the overall information generated by a component to be received by another component. Return points corresponds to the point in control logic where a component resumes control after sending results to another component. Loop points correspond to points before the end of a loop over items of a component. For example, loop point 1120C may receive filter rules from filter manager 206 for removing event nodes from an activity data structure that are not relevant to provenance applications. Furthermore, each point may be associated with a state of interest at the point. For instance, loop point 1120C is associated with the current activity data structure and its associated activity. In this context, logic injected in loop point 1120C may read, alter, and/or not consider the available state.

As described above, database systems may execute high loads of queries and generate many query execution event records. In this context, a provenance data model would include many entities and relationships; however, at least a portion of the entities and relationships may not be of interest to upstream provenance applications. In accordance with an embodiment, filters and compressors may be introduced via the hooking system described with respect to FIG. 12. For instance, each filter implements a consume method that receives the state available at a point and alters the state to filter out items from further processing. Each filter includes a set of conditions for checking whether an item of the state should be filtered or not. After items are filtered, the logic may be injected to at the point. A similar method may be used for compression process described herein. For instance, in accordance with an embodiment, a compressor updates an internal state to encode compression semantics.

While hooking systems have been described with respect to filter managers and compression managers, it is also contemplated herein that other components of a provenance extraction engine and/or an associated database system may interface with points of a component. For example, report managers may interface with points of a hooking system. In an example embodiment, report manager 204 tracks lightweight statistics (e.g., the number of queries or the number of activities processed so far). For instance, report manager 204 may capture information at various points across a component such as activity collector 1100. The captured information may be used to compute telemetry reports from each component over the state available at each point, or from combining logic across points (e.g., time spent by a component is captured by subtracting the timestamp before an operation of a component from the timestamp after the operation of the component). The reporting telemetry may be used for a variety of purposes, such as introducing filtering and compression optimizations, updating users online with the state of the overall processing, and/or debugging provenance extraction engine 200 for improved response to potential incidents.

Thus, a hooking system has been described with respect to activity collector 1100. It is contemplated herein that similar hooking systems may be implemented with respect to other components of a provenance extraction engine, e.g., extractor(s) 212, stitcher 214, uploader 216, and/or other components and/or subcomponents as described elsewhere herein. Types of points such as start points 1112, end points 1114, result points 1116A, return points 1118A, and loop points 1120 have been described, however other types of points may be used. For instance, a second type of loop point may be used to access different stages of a loop (e.g., the start of a loop, an intermediate step of a loop, etc.).

Filter manager 206 may execute filtering logic to perform the various filtering techniques described herein. For instance, filter manager 206 may execute filtering logic to filter query execution event records received and/or processed by, activities identified and/or processed by, activity data structures generated by, information extracted by, and/or provenance data models generated by provenance extraction engine 200. As described above, filter manager 206 may execute filtering logic via the hooking system; however, other filters may be used in components of provenance extraction engine 200. For example, filter manager 206 may execute filtering logic to filter based on one or more of the following.

Boolean Conditions. In accordance with an embodiment, a filtering technique may filter query execution event records based on Boolean conditions of metadata available for the query execution event records (e.g., a condition of the form client_app_name=='SSMS' or username='sa'). In another embodiment, a filter may remove activities that depend on events matching a Boolean condition (e.g., do not consider activities if at least one of the corresponding query execution event records has a client_app_name='SSMS' or username='sa').

Query Execution Event Record Type. Query execution event records and/or activities may be filtered by type, in embodiments. For example, activities not containing an execution of a stored procedure may be removed. In accordance with another embodiment, connections (e.g., dependencies and/or relationships described elsewhere herein) where no stored procedure was executed as part of the connection may be removed or otherwise not considered by extractor(s) 212 of FIG. 2. In another example embodiment, only the most recent N executions of a stored procedure are considered for generating the provenance data model.

Lineage. Filters in accordance with an embodiment may filter query execution event records, activities, and/or provenance information based on lineage information extracted by lineage extractor 212B of FIG. 2. For instance, if a query entity or query run entity has no lineage information extracted for it (e.g., a PRINT statement), the filter condition removes the query entity or query run entity from consideration by provenance extraction engine 200. In particular, the filter condition may be specialized to filter out queries that do not contain inputs, or filter out queries that only have outputs, depending on the particular implementation. In accordance with another example embodiment, a metadata condition may be introduced on the query entity (or query run entity). For instance, arbitrary SELECT queries not coming from an application of interest may be removed. Furthermore, query entities may have lineage information associated with them, however, the lineage information may be irrelevant to provenance applications (e.g., lineage of SET queries of SELECT queries whose output is input to IF statements). In this context, irrelevant lineage information or query entities with irrelevant lineage information may be filtered from further processing.

Compression manager 208 is configured to compress information associated with query execution event records received and/or processed by, activities identified and/or processed by, activity data structures generated by, information extracted by, and/or provenance data models generated by provenance extraction engine 200. Compression manager 208 may compress information in various ways. For example, in accordance with an embodiment, compression manager 208 may execute compression logic to deduplicate query runs within an activity to the latest N runs. The deduplication process may be implemented as part of a pruning process of activity data structures (e.g., XRun-Trees). For instance, a stored procedure may execute many similar queries within a FOR loop. The execution of the similar queries may generate many redundant query execution event records, each including redundant information. Compression manager 208 may identify and reduce the number of query execution event records having redundant information. In this context, compression manager 208 reduces the overall working memory footprint per activity analyzed by provenance extraction engine 200.

IV. Further Example Embodiments and Advantages

As noted above, systems and devices, including provenance extraction engines, may be configured in various ways to efficiently extract provenance information from database query execution logs. Provenance extraction engines have been described with respect to database systems, however it is also contemplated herein that provenance extraction engines may be used in a variety of applications, such as, but not limited to, compliance systems, enterprise systems, cloud computing service systems, auditing systems, and/or the like, as would be understood by a person of skill in the relevant art(s) having benefit of the present disclosure. Provenance extraction engines have been described with respect to receiving query execution event records from one or more database query execution logs, however it is also contemplated herein that query execution event records may be received in a variety of ways. For example, traces of a query execution may be obtained via streaming mechanisms. Furthermore, example provenance applications have been described with respect to impact analysis and root cause analysis, however, the techniques and embodiments of the present disclosure are not limited to only these examples.

Furthermore, a provenance extraction engine that efficiently extracts provenance information from database execution query logs may be implemented in a database system agnostic to the database engine or version. Embodiments of provenance extraction engines described herein may be configured to interface with various versions of databases and various types of workloads. Some embodiments of provenance extraction engines may be implemented with few or no changes to the database system or user code, depending on the particular implementation. Such provenance extraction engines may interoperate with legacy database systems already deployed in production environments as well as new database systems.

As described herein, embodiments of provenance extraction engines may identify groups of related query execution event records and define each group as an activity. Individual query execution event records may be emitted by a database system asynchronously, depending on the particular implementation. Provenance information with respect to direct and/or indirect transformations of datasets may be fragmented across multiple query execution event records. Embodiments of provenance extraction engines described herein collect and identify groups of related query execution event records and define each group as an activity. In this way, complete or near complete provenance information may be extracted from an activity. Furthermore, triggers and side effects of executing various queries, stored procedures, query batches, and/or workloads may be tracked via analyzing activity data structures as described elsewhere herein.

Moreover, according to the described embodiments and techniques, any components of provenance extraction engines and their functions may be caused to be activated for operation/performance thereof based on other operations, functions, actions, and/or the like, including initialization, completion, and/or performance of the, functions, actions, and/or the like.

In some example embodiments, one or more of the operations of the flowcharts described herein may not be performed. Moreover, operations in addition to or in lieu of the operations of the flowcharts described herein may be performed. Further, in some example embodiments, one or more of the operations of the flowcharts described herein may be performed out of order, in an alternate sequence, or partially (or completely) concurrently with each other or with other operations.

The further example embodiments and advantages described in this Section may be applicable to any embodiments disclosed in this Section or in any other Section of this disclosure.

The embodiments described herein and/or any further systems, sub-systems, devices and/or components disclosed herein may be implemented in hardware (e.g., hardware logic/electrical circuitry), or any combination of hardware with software (computer program code configured to be executed in one or more processors or processing devices) and/or firmware.

V. Example Computer System Implementations

Computing device(s) 102, host system 104, database(s) 106, network 108, event record selector 110, selected event storage 112, provenance extraction engine 114, event storage 116, data catalog 118, provenance extraction engine 200, state manager 202, report manager 204, filter manager 206, compression manager 208, activity collector 210, extractor(s) 212, runtime information extractor 212A, lineage information extractor 212B, stitcher 214, uploader 216, flowchart 300, flowchart 400, activity collector 1100, event downloader 1104, activity generator 1106, activity sorter 1108, and/or activity data structure generator 1110 may be implemented in hardware, or hardware with any combination of software and/or firmware, including being implemented as computer program code configured to be executed in one or more processors and stored in a computer readable storage medium, or being implemented as hardware logic/electrical circuitry, such as being implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 12:
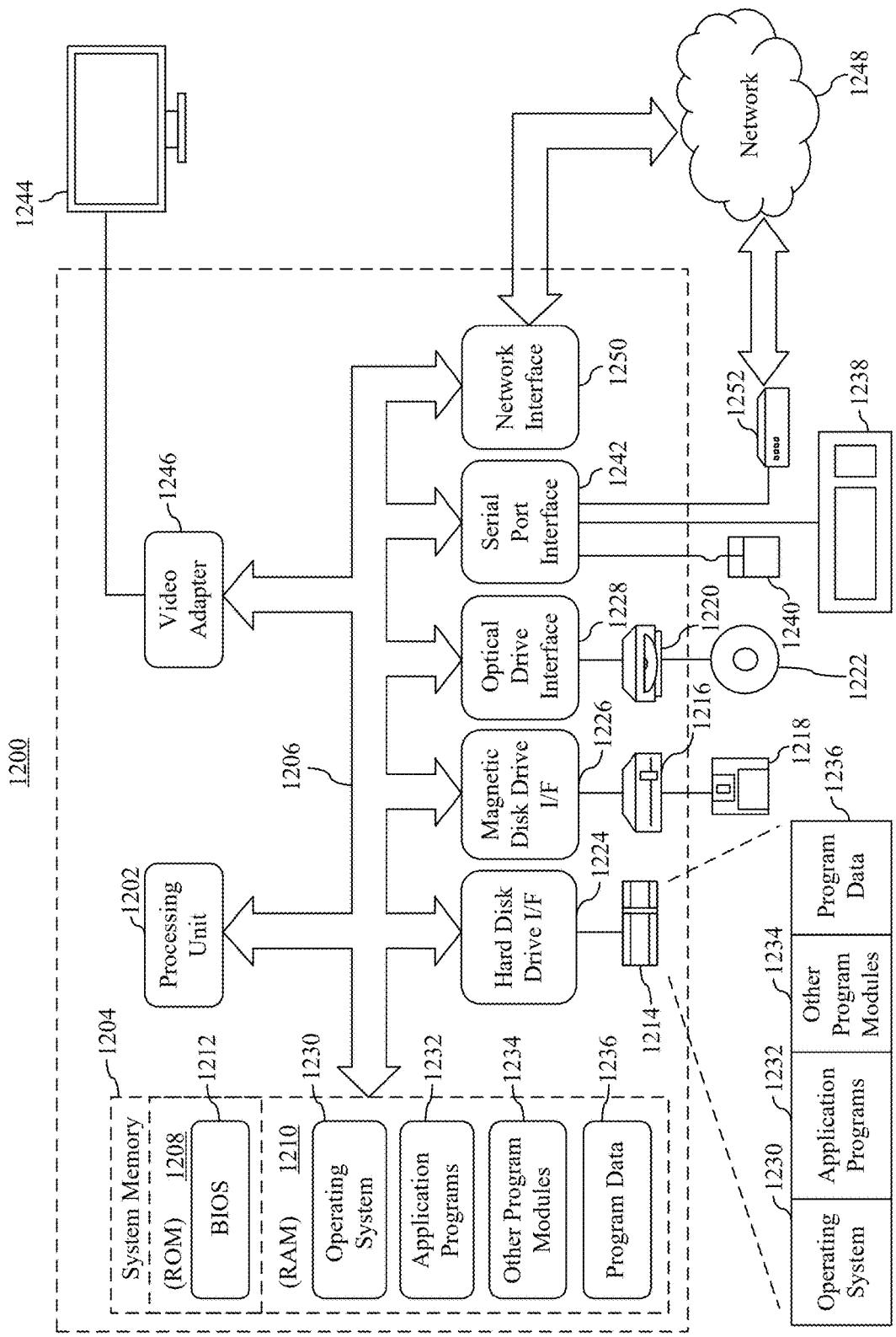
FIG. 12 is a block diagram of an example computer system that may be used to implement embodiments.

FIG. 12 depicts an exemplary implementation of a computer system 1200 ("system 1200" herein) in which embodiments may be implemented. For example, system 1200 may be used to implement computing device(s) 102, host system 104, and/or database(s) 106, as described above in reference to FIG. 1. System 1200 may also be used to implement provenance extraction engine 200, as described above in reference to FIG. 2. System 1200 may also be used to implement activity collector 1100, as described above in reference to FIG. 11. System 1200 may also be used to implement any of the steps of any of the flowcharts of FIG. 3 and/or FIG. 4, as described above. System 1200 may also be used to implement any computations, executions, identifications, definitions, extractions, mappings, analyses, determinations, calculations, generations, storage, and/or the like associated with embodiments of FIGS. 5-10. The description of system 1200 provided herein is provided for purposes of illustration and is not intended to be limiting. Embodiments may be implemented in further types of computer systems, as would be known to persons skilled in the relevant art(s).

As shown in FIG. 12, system 1200 includes one or more processors, referred to as processor unit 1202, a system memory 1204, and a bus 1206 that couples various system components including system memory 1204 to processor unit 1202. Processor unit 1202 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor unit 1202 may execute program code stored in a computer readable medium, such as program code of operating system 1230, application programs 1232, other programs 1234, etc. Bus 1206 represents one or more of any of several types of bus structures, including a memory bus or memory controller, a peripheral bus, an accelerated graphics port, and a processor or local bus using any of a variety of bus architectures. System memory 1204 includes read only memory (ROM) 1208 and random-access memory (RAM) 1210. A basic input/output system 1212 (BIOS) is stored in ROM 1208.

System 1200 also has one or more of the following drives: a hard disk drive 1214 for reading from and writing to a hard disk, a magnetic disk drive 1216 for reading from or writing to a removable magnetic disk 1218, and an optical disk drive 1220 for reading from or writing to a removable optical disk 1222 such as a CD ROM, DVD ROM, or other optical media. Hard disk drive 1214, magnetic disk drive 1216, and optical disk drive 1220 are connected to bus 1206 by a hard disk drive interface 1224, a magnetic disk drive interface 1226, and an optical drive interface 1228, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards and drives (e.g., solid state drives (SSDs)), digital video disks, RAMs, ROMs, and other hardware storage media.

A number of program modules or components may be stored on the hard disk, magnetic disk, optical disk, ROM, or RAM. These program modules include an operating system 1230, one or more application programs 1232, other program modules 1234, and program data 1236. In accordance with various embodiments, the program modules may include computer program logic that is executable by processing unit 1202 to perform any or all the functions and features of host system 104, network 108, event record selector 110, provenance extraction engine 114, provenance extraction engine 200, state manager 202, report manager 304, filter manager 206, compression manager 208, activity collector 210, extractor(s) 212, runtime information extractor 212A, lineage information extractor 212B, stitcher 214, uploader 216, flowchart 300, flowchart 400, activity collector 1100, event downloader 1104, activity generator 1106, activity sorter 1108, and/or activity data structure generator 1110 (including any steps of flowcharts 300 and/or 400).

A user may enter commands and information into the system 1200 through input devices such as keyboard 1238 and pointing device 1240. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor unit 1202 through a serial port interface 1242 that is coupled to bus 1206, but may be connected by other interfaces, such as a parallel port, game port, or a universal serial bus (USB).

A display screen 1244 is also connected to bus 1206 via an interface, such as a video adapter 1246. Display screen 1244 may be external to, or incorporated in, system 1200. For example, display screen 1244 may be a display screen of host system 104 of FIG. 1, host system 202 of FIG. 2, and/or the like. Display screen 1244 may display information, as well as being a user interface for receiving user commands and/or other information (e.g., by touch, finger gestures, virtual keyboard, etc.). For example, display screen 1244 may be configured to display provenance data model 1000. In addition to display screen 1244, system 1200 may include other peripheral output devices (not shown) such as speakers and printers.

System 1200 is connected to a network 1248 (e.g., the Internet) through an adaptor or network interface 1250, a modem 1252, or other means for establishing communications over the network. Modem 1252, which may be internal or external, may be connected to bus 1206 via serial port interface 1242, as shown in FIG. 12, or may be connected to bus 1206 using another interface type, including a parallel interface.

As used herein, the terms "computer program medium," "computer-readable medium," and "computer-readable storage medium" are used to refer to physical hardware media such as the hard disk associated with hard disk drive 1214, removable magnetic disk 1218, removable optical disk 1222, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1232 and other programs 1234) may be stored on the hard disk, magnetic disk, optical disk, ROM, RAM, or other hardware storage medium. Such computer programs may also be received via network interface 1250, serial port interface 1242, or any other interface type. Such computer programs, when executed or loaded by an application, enable system 1200 to implement features of embodiments described herein. Accordingly, such computer programs represent controllers of the system 1200.

Embodiments are also directed to computer program products comprising computer code or instructions stored on any computer-readable medium. Such computer program products include hard disk drives, optical disk drives, memory device packages, portable memory sticks, memory cards, and other types of physical storage hardware. In accordance with various embodiments, the program modules may include computer program logic that is executable by processing unit 1202 to perform any or all of the functions and features of host system 104, network 108, event record selector 110, and/or provenance extraction engine 112 as described above in reference to FIG. 1, provenance extraction engine 200, state manager 202, report manager 204, filter manager 206, compression manager 208, activity collector 210, extractor(s) 212, runtime information extractor 212A, lineage information extractor 212B, stitcher 214, and/or uploader 216 as described above in reference to FIG. 2, and/or activity collector 1100, event downloader 1104, activity generator 1106, activity sorter 1108, and/or activity data structure generator 1110 as described above in reference to FIG. 11. The program modules may also include computer program logic that, when executed by processing unit 1202, causes processing unit 1202 to perform any of the steps of any of the flowcharts of FIGS. 3 and 4, as described above. The program modules may also include computer program logic that, when executed by processing unit 1202, causes processing unit 1202 to perform any of the various computations, executions, identifications, definitions, extractions, mappings, analyses, determinations, calculations, generations, storage, and/or the like associated with embodiments of FIGS. 5-10, as described above.

VI. Additional Exemplary Embodiments

In an embodiment, a method for extracting provenance information from one or more database query execution logs for use by a provenance application is performed. The method includes receiving a set of query execution event records extracted from the one or more database query execution logs. Groups of related query execution event records within the set of query execution event records are identified. Each identified group is defined as an activity. For each activity, an activity data structure is generated based on the group of query execution event records associated with the activity. The activity data structure encodes query execution dependencies for the activity. For each activity, runtime information is extracted by identifying and instantiating process entities and relationships for the activity based on the group of query execution event records and the activity data structure associated with the activity. For each activity, lineage information is extracted by identifying and instantiating dataset entities and their lineage relationships based on query text within the query execution event records associated with the activity. The lineage information is mapped to the runtime information for each activity to generate a provenance data model. The provenance data model is stored for use by the provenance application.

In an embodiment, the set of query execution event records comprises a selected subset of a plurality of query execution records stored in the one or more database query execution logs.

In an embodiment, the selected subset of the plurality of query execution event records includes query execution event records that indicate a start of a query and query execution event records that indicate a completion of a query.

In an embodiment, the provenance application includes an impact analysis application that is configured to use the provenance data model to determine an impact of a data asset in a data estate or a root cause analysis application that is configured to use the provenance data model to identify one or more root causes for a problem related to one or more entities.

In an embodiment the activity data structure is generated for each activity by generating, for each activity, a tree data structure based on the group of query execution event records associated with the activity. The tree data structure encodes query execution dependencies for the activity.

In an embodiment, filtering and compression logic is executed to perform one or more of removing certain query execution event records from the set of query execution event records; removing certain activities from the set of defined activities; removing certain nodes from a plurality of nodes that include an activity data structure; or removing certain process entities and relationships from the provenance data model.

In an embodiment, the process entities include one or more of a query, a query run, a stored procedure, a stored procedure run, a statement; a statement run; a trigger; a trigger run; a function; a function run; a query batch, or a query batch run.

In an embodiment, an activity includes a set of query execution events originating from queries whose execution depends on one another.

In an embodiment a system includes a memory that stores program code and a processing system, including one or more processors, configured to execute the program code. When executed, the program code causes the processing system to receive a set of query execution event records extracted from one or more database query execution logs. The program code further causes the processing system to identify groups of related query execution event records within the set of query execution event records and define each identified group as an activity. The program code further causes the processing system to generate, for each activity, an activity data structure based on the group of query execution event records associated with the activity. The activity data structure encodes query execution dependencies for the activity. The program code further causes the processing system to, for each activity, extract runtime information by identifying and instantiating process entities and relationships for the activity based on the group of query execution event records and the activity data structure associated with the activity. The program code further causes the processing system to, for each activity, extract lineage information by identifying and instantiating dataset entities and their lineage relationships based on query text within the query execution event records associated with the activity. The program code further causes the processing system to, map the lineage information to the runtime information for each activity to generate a provenance data model. The program code further causes the processing system to store the provenance data model for use by a provenance application.

In an embodiment, the set of query execution event records includes a selected subset of a plurality of query execution records stored in the one or more database query execution logs.

In an embodiment, the selected subset of the plurality of query execution event records includes query execution event records that indicate a start of a query and query execution event records that indicate a completion of a query.

In an embodiment, the provenance application includes an impact analysis application that is configured to use the provenance data model to determine an impact of a data asset in a data estate or a root cause analysis application that is configured to use the provenance data model to identify one or more root causes for a problem related to one or more entities.

In an embodiment, the program code further causes the processing system to generate the activity data structure for each activity by generating, for each activity, a tree data structure based on the group of query execution event records associated with the activity. The tree data structure encodes query execution dependencies for the activity.

In an embodiment, the program code includes filtering and compression logic that, when executed, causes the processing system to perform one or more of: remove certain query execution event records from the set of query execution event records; remove certain activities from the set of defined activities; remove certain nodes from a plurality of nodes that comprise an activity data structure; or remove certain process entities and relationships from the provenance data model.

In an embodiment, the process entities include one or more of a query, a query run, a stored procedure, a stored procedure run, a statement; a statement run; a trigger; a trigger run; a function; a function run; a query batch, or a query batch run.

In an embodiment, an activity includes a set of query execution events originating from queries whose execution depends on one another.

In an embodiment, a computer-readable storage medium has programming instructions encoded thereon that are executable by one or more processors to perform a method. The method receiving a set of query execution event records extracted from one or more database query execution logs. The method further includes identifying groups of related query execution event records within the set of query execution event records and defining each identified group as an activity. For each activity, an activity data structure is generated based on the group of query execution event records associated with the activity. The activity data structure encodes query execution dependencies for the activity. For each activity, runtime information is extracted by identifying and instantiating process entities and relationships for the activity based on the group of query execution event records and the activity data structure associated with the activity. For each activity, lineage information is extracted by identifying and instantiating dataset entities and their lineage relationships based on query text within the query execution event records associated with the activity. The lineage information is mapped to the runtime information for each activity to generate a provenance data model. The provenance data model is stored for use by a provenance application.

In an embodiment, the set of query execution event records includes a selected subset of a plurality of query execution records stored in the one or more database query execution logs.

In an embodiment, the provenance application includes an impact analysis application that is configured to use the provenance data model to determine an impact of a data asset in a data estate or a root cause analysis application that is configured to use the provenance data model to identify one or more root causes for a problem related to one or more entities.

In an embodiment, the activity data structure for each activity is generated by generating, for each activity, a tree data structure based on the group of query execution event records associated with the activity, the tree data structure encoding query execution dependencies for the activity.

VII. Conclusion

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A method for extracting provenance information from one or more database query execution logs for use by a provenance application, the method comprising:
   receiving a set of query execution event records extracted from the one or more database query execution logs;
   identifying groups of related query execution event records within the set of query execution event records and defining each identified group as an activity;
   generating, for each activity, an activity data structure based on the group of query execution event records associated with the activity, the activity data structure encoding query execution dependencies for the activity;
   for each activity, extracting runtime information by identifying and instantiating process entities and relationships for the activity based on the group of query execution event records and the activity data structure associated with the activity;
   for each activity, extracting lineage information by identifying and instantiating dataset entities and their lineage relationships based on query text within the query execution event records associated with the activity;
   mapping the lineage information to the runtime information for each activity to generate a provenance data model; and
   storing the provenance data model for use by the provenance application.

2. The method of claim 1, wherein the set of query execution event records comprises a selected subset of a plurality of query execution records stored in the one or more database query execution logs.

3. The method of claim 2, wherein the selected subset of the plurality of query execution event records includes query execution event records that indicate a start of a query and query execution event records that indicate a completion of a query.

4. The method of claim 1, wherein the provenance application comprises:
   an impact analysis application that is configured to use the provenance data model to determine an impact of a data asset in a data estate; or
   a root cause analysis application that is configured to use the provenance data model to identify one or more root causes for a problem related to one or more entities.

5. The method of claim 1, wherein generating, for each activity, the activity data structure comprises:
generating, for each activity, a tree data structure based on the group of query execution event records associated with the activity, the tree data structure encoding query execution dependencies for the activity.

6. The method of claim 1, further comprising executing filtering and compression logic to perform one or more of:
removing certain query execution event records from the set of query execution event records;
removing certain activities from the set of defined activities;
removing certain nodes from a plurality of nodes that comprise an activity data structure; or
removing certain process entities and relationships from the provenance data model.

7. The method of claim 1, wherein the process entities comprise one or more of:
a query;
a query run;
a stored procedure;
a stored procedure run;
a statement;
a statement run;
a trigger;
a trigger run;
a function;
a function run;
a query batch; or
a query batch run.

8. The method of claim 1, wherein an activity comprises a set of query execution events originating from queries whose execution depends on one another.

9. The method of claim 1, wherein the set of query execution logs are extracted in real time.

10. A system comprising:
a memory that stores program code;
a processing system, comprising one or more processors, configured to execute the program code that, when executed, causes the processing system to:
receive a set of query execution event records extracted from one or more database query execution logs;
identify groups of related query execution event records within the set of query execution event records and define each identified group as an activity;
generate, for each activity, an activity data structure based on the group of query execution event records associated with the activity, the activity data structure encoding query execution dependencies for the activity;
for each activity, extract runtime information by identifying and instantiating process entities and relationships for the activity based on the group of query execution event records and the activity data structure associated with the activity;
for each activity, extract lineage information by identifying and instantiating dataset entities and their lineage relationships based on query text within the query execution event records associated with the activity;
map the lineage information to the runtime information for each activity to generate a provenance data model; and
store the provenance data model for use by a provenance application.

11. The system of claim 10, wherein the set of query execution event records comprises a selected subset of a plurality of query execution records stored in the one or more database query execution logs.

12. The system of claim 11, wherein the selected subset of the plurality of query execution event records includes query execution event records that indicate a start of a query and query execution event records that indicate a completion of a query.

13. The system of claim 10, wherein the provenance application comprises:
an impact analysis application that is configured to use the provenance data model to determine an impact of a data asset in a data estate; or
a root cause analysis application that is configured to use the provenance data model to identify one or more root causes for a problem related to one or more entities.

14. The system of claim 10, wherein the processing system generates, for each activity, the activity data structure by:
generating, for each activity, a tree data structure based on the group of query execution event records associated with the activity, the tree data structure encoding query execution dependencies for the activity.

15. The system of claim 10, wherein the program code comprises filtering and compression logic that, when executed, causes the processing system to perform one or more of:
remove certain query execution event records from the set of query execution event records;
remove certain activities from the set of defined activities;
remove certain nodes from a plurality of nodes that comprise an activity data structure; or
remove certain process entities and relationships from the provenance data model.

16. The system of claim 15, wherein the process entities comprise one or more of:
a query;
a query run;
a stored procedure;
a stored procedure run;
a statement;
a statement run;
a trigger;
a trigger run;
a function;
a function run;
a query batch; or
a query batch run.

17. A computer-readable storage medium having programming instructions encoded thereon that are executable by one or more processors to perform a method, the method comprising:
receiving a set of query execution event records extracted from one or more database query execution logs;
identifying groups of related query execution event records within the set of query execution event records and defining each identified group as an activity;
generating, for each activity, an activity data structure based on the group of query execution event records associated with the activity, the activity data structure encoding query execution dependencies for the activity;
for each activity, extracting runtime information by identifying and instantiating process entities and relationships for the activity based on the group of query execution event records and the activity data structure associated with the activity;

for each activity, extracting lineage information by identifying and instantiating dataset entities and their lineage relationships based on query text within the query execution event records associated with the activity;

mapping the lineage information to the runtime information for each activity to generate a provenance data model; and storing the provenance data model for use by a provenance application.

18. The computer-readable storage medium of claim 17, wherein the set of query execution event records comprises a selected subset of a plurality of query execution records stored in the one or more database query execution logs.

19. The computer-readable storage medium of claim 17, wherein the provenance application comprises:

an impact analysis application that is configured to use the provenance data model to determine an impact of a data asset in a data estate; or a root cause analysis application that is configured to use the provenance data model to identify one or more root causes for a problem related to one or more entities.

20. The computer-readable storage medium of claim 17, wherein generating, for each activity, the activity data structure comprises:

generating, for each activity, a tree data structure based on the group of query execution event records associated with the activity, the tree data structure encoding query execution dependencies for the activity.

* * * * *